United States Patent
Marzencki et al.

(10) Patent No.: US 8,849,926 B2
(45) Date of Patent: Sep. 30, 2014

(54) SYSTEM AND METHOD FOR SELF-CALIBRATING, SELF-ORGANIZING AND LOCALIZING SENSORS IN WIRELESS SENSOR NETWORKS

(75) Inventors: Marcin Jan Marzencki, Burnaby (CA); Bozena Kaminska, Vancouver (CA)

(73) Assignee: Simon Fraser University, Burnaby (CA)

( * ) Notice: Subject to any disclaimer, the term of this patent is extended or adjusted under 35 U.S.C. 154(b) by 295 days.

(21) Appl. No.: 12/852,424

(22) Filed: Aug. 6, 2010

(65) Prior Publication Data

US 2012/0036198 A1    Feb. 9, 2012

(51) Int. Cl.
| | |
|---|---|
| G06F 15/16 | (2006.01) |
| G06F 15/173 | (2006.01) |
| H04W 84/18 | (2009.01) |
| H04L 29/12 | (2006.01) |
| H04W 52/50 | (2009.01) |
| H04W 52/36 | (2009.01) |
| H04W 52/32 | (2009.01) |
| H04B 17/00 | (2006.01) |

(52) U.S. Cl.
CPC ......... *H04L 61/6081* (2013.01); *H04W 52/362* (2013.01); *H04W 84/18* (2013.01); *H04W 52/322* (2013.01); *H04B 17/0057* (2013.01); *H04B 17/0072* (2013.01); *H04W 52/50* (2013.01)
USPC ............................ 709/206; 709/224; 709/226

(58) Field of Classification Search
USPC ....................................................... 709/206
See application file for complete search history.

(56) References Cited

U.S. PATENT DOCUMENTS

| | | | |
|---|---|---|---|
| 4,728,959 | A | 3/1988 | Maloney et al. |
| 5,491,486 | A | 2/1996 | Welles et al. |
| 5,691,980 | A | 11/1997 | Welles, II et al. |
| 5,959,580 | A | 9/1999 | Maloney et al. |

(Continued)

FOREIGN PATENT DOCUMENTS

| | | |
|---|---|---|
| EP | 1 835 668 | 9/2007 |
| WO | WO2007002286 | 1/2007 |
| WO | WO2007118108 | 10/2007 |

OTHER PUBLICATIONS

M. Marzencki, B. Hung, P. Lin, Y. Huang, T. Cho, Y. Chuo, and B. Kaminska, Context-aware physiological data acquisition and processing with wireless sensor networks, in Proc. MeMeA 2010, Ottawa, ON, Apr. 30-May 1, 2010, pp. 53-56.

(Continued)

*Primary Examiner* — Melvin H Pollack
(74) *Attorney, Agent, or Firm* — Palmer IP

(57) ABSTRACT

A method of self-organizing sensor nodes in a wireless sensor network (WSN); a method of localizing mobile nodes in a WSN; and a method of self-calibrating a WSN are disclosed. The method of self-organizing sensor nodes in a WSN includes configuring sensor nodes to in turn broadcast consecutive messages at a plurality of pre-defined and incrementally increasing power levels; detecting receipt of the broadcasted messages at each of the sensor nodes and notifying a master node as to the identity of each sensor node receiving the broadcasted message and the power level at which it was received to define a detected neighborhood for each sensor node; determining relative locations of sensor nodes with the detected neighborhoods; and mapping relative locations of the sensor nodes by the master node based on results of the neighborhood detection and known locations of two anchor nodes.

7 Claims, 13 Drawing Sheets

(56) References Cited

U.S. PATENT DOCUMENTS

| | | | |
|---|---|---|---|
| 6,047,192 A | 4/2000 | Maloney et al. | |
| 6,259,991 B1 | 7/2001 | Nysen | |
| 6,744,740 B2 * | 6/2004 | Chen | 370/255 |
| 6,998,985 B2 | 2/2006 | Reisman et al. | |
| 7,242,294 B2 * | 7/2007 | Warrior et al. | 340/539.22 |
| 7,489,935 B2 | 2/2009 | Zekavat | |
| 7,545,281 B2 * | 6/2009 | Richards et al. | 340/573.1 |
| 7,576,694 B2 | 8/2009 | Anjum et al. | |
| 7,590,611 B2 * | 9/2009 | Hur et al. | 706/52 |
| 7,603,129 B2 | 10/2009 | Gonia et al. | |
| 7,633,882 B2 * | 12/2009 | Das et al. | 370/252 |
| 7,783,457 B2 * | 8/2010 | Cunningham | 702/189 |
| 7,818,017 B2 * | 10/2010 | Alizadeh-Shabdiz et al. | 455/456.6 |
| 7,830,838 B2 * | 11/2010 | Kohvakka et al. | 370/330 |
| 7,855,684 B2 * | 12/2010 | Ryu et al. | 342/464 |
| 7,937,167 B1 * | 5/2011 | Mesarina et al. | 700/78 |
| 7,940,211 B2 * | 5/2011 | Scherzinger | 342/357.28 |
| 8,005,486 B2 * | 8/2011 | Pahlavan et al. | 455/456.1 |
| 8,022,822 B2 * | 9/2011 | Liang et al. | 340/539.18 |
| 8,026,808 B2 * | 9/2011 | Weaver et al. | 340/539.22 |
| 8,031,657 B2 * | 10/2011 | Jones et al. | 370/328 |
| 8,040,859 B2 * | 10/2011 | Chowdhury et al. | 370/338 |
| 8,049,666 B2 * | 11/2011 | Doh et al. | 342/363 |
| 8,054,762 B2 * | 11/2011 | Potkonjak | 370/254 |
| 8,064,363 B2 * | 11/2011 | Kohvakka et al. | 370/254 |
| 8,072,928 B2 * | 12/2011 | Sinha | 370/329 |
| 8,081,590 B2 * | 12/2011 | Patterson et al. | 370/311 |
| 8,085,672 B2 * | 12/2011 | Subramanian et al. | 370/238 |
| 8,086,433 B2 * | 12/2011 | Lee et al. | 703/13 |
| 8,089,827 B2 * | 1/2012 | Carotenuto | 367/128 |
| 8,107,397 B1 * | 1/2012 | Bagchi et al. | 370/254 |
| 8,107,446 B2 * | 1/2012 | Shoarinejad | 370/338 |
| 8,111,619 B2 * | 2/2012 | Liu et al. | 370/229 |
| 8,131,839 B2 * | 3/2012 | Yu et al. | 709/224 |
| 8,140,658 B1 * | 3/2012 | Gelvin et al. | 709/224 |
| 8,190,109 B2 * | 5/2012 | Ali et al. | 455/123 |
| 8,204,971 B2 * | 6/2012 | Ewing et al. | 709/221 |
| 8,219,114 B2 * | 7/2012 | Larsen | 455/456.1 |
| 8,233,905 B2 * | 7/2012 | Vaswani et al. | 455/445 |
| 8,243,620 B2 * | 8/2012 | Coleri Ergen et al. | 370/252 |
| 8,295,183 B2 * | 10/2012 | Van Der Wateren | 370/241 |
| 8,295,280 B2 * | 10/2012 | Gopalakrishna et al. | 370/389 |
| 8,300,615 B2 * | 10/2012 | Copeland et al. | 370/338 |
| 8,321,171 B2 * | 11/2012 | Borean et al. | 702/142 |
| 8,325,746 B2 * | 12/2012 | Somasundaram et al. | 370/401 |
| 8,331,364 B2 * | 12/2012 | Curclo et al. | 370/389 |
| 8,380,072 B2 * | 2/2013 | Wang et al. | 398/115 |
| 8,385,322 B2 * | 2/2013 | Colling et al. | 370/350 |
| 2003/0072306 A1 | 4/2003 | Hunzinger | |
| 2005/0074025 A1 * | 4/2005 | Shao et al. | 370/461 |
| 2006/0253570 A1 | 11/2006 | Biswas et al. | |
| 2007/0077941 A1 | 4/2007 | Gonia et al. | |
| 2007/0111735 A1 | 5/2007 | Srinivasan et al. | |
| 2007/0293237 A1 | 12/2007 | Correal et al. | |
| 2008/0080441 A1 | 4/2008 | Park et al. | |
| 2008/0232281 A1 | 9/2008 | Pahlavan et al. | |
| 2010/0183089 A1 * | 7/2010 | Vasil'Evich et al. | 375/267 |
| 2010/0254312 A1 * | 10/2010 | Kennedy | 370/328 |
| 2010/0259365 A1 * | 10/2010 | Knadle et al. | 340/10.1 |
| 2011/0055424 A1 * | 3/2011 | Jiang et al. | 709/238 |
| 2011/0176469 A1 * | 7/2011 | Kim et al. | 370/311 |
| 2011/0210843 A1 * | 9/2011 | Kummetz | 340/517 |
| 2011/0218759 A1 | 9/2011 | Jin | |
| 2011/0250904 A1 * | 10/2011 | Valletta et al. | 455/456.1 |
| 2011/0261738 A1 * | 10/2011 | Mukherjee | 370/311 |
| 2011/0299425 A1 * | 12/2011 | Kumar | 370/255 |
| 2011/0299470 A1 * | 12/2011 | Muller et al. | 370/328 |
| 2011/0312279 A1 * | 12/2011 | Tsai et al. | 455/67.11 |
| 2012/0015665 A1 * | 1/2012 | Farley et al. | 455/456.1 |
| 2012/0052884 A1 * | 3/2012 | Bogatin | 455/456.6 |
| 2012/0057506 A1 * | 3/2012 | Kumar | 370/311 |
| 2012/0064833 A1 * | 3/2012 | Nakano et al. | 455/63.1 |
| 2012/0122485 A1 * | 5/2012 | Bartlett | 455/456.1 |
| 2012/0314660 A1 * | 12/2012 | Leppanen et al. | 370/328 |

OTHER PUBLICATIONS

M. Marzencki, Y. Huang, and B. Kaminska, Context-Based Collaborative Self-Test for Autonomous Wireless Sensor Networks, in Proc. IMS3TW 2011, Santa Barbara, CA, May 16-18, 2011.

Jeremy Elson, A Survey of Localization Method, Presentation to CS694, Nov. 19, 1999.

Tod Riedel, Self-Organizing, Wireless Sensor Networks, Remote Magazine, Site & Equipment Management, Apr./May 2004 Issue, Apr./May 2004.

* cited by examiner

SYSTEM AND METHOD FOR SELF-CALIBRATING, SELF-ORGANIZING AND LOCALIZING SENSORS IN WIRELESS SENSOR NETWORKS

1. TECHNICAL FIELD

The present invention relates generally to the field of wireless networks, and more particularly, to the field of Wireless Sensor Networks ("WSN").

2. BACKGROUND OF THE INVENTION

Wireless sensor networks may typically involve hundreds or thousands of small, preferably inexpensive sensor devices or nodes that can remotely communicate with neighboring devices such as over a wireless communication link within a limited radio range. The devices typically include a sensing ability, computational ability, and bi-directional wireless communications ability, and may also include an integrated power supply. By relaying information to each other, sensors operate to transmit signals to a command post or central network sensor or gateway which may be located anywhere within the network.

Wireless sensors are used to detect any of a variety of parameters, including for example: environmental; motion or force; electromagnetic; and chemical or biological data. They are used in a wide variety of applications such as: agriculture; weather; aerospace; military; environment or industrial control and monitoring; wildlife monitoring; security monitoring; inventory control; and many others.

In order to make the use of the data collected by the sensors practical, it is desirable to know the location of each sensor in the network. Known sensor localization methods include use of the global navigation satellite systems ("GNSS"), triangulation-based multidimensional scaling, convex optimization, and semidefinite programming ("SDP") relaxation, for example.

Localization based on GNSS, such as the global positioning system ("GPS"), the global navigation satellite system ("GLONASS"), and the Galileo positioning system for example, suffers from many potential drawbacks. For example, a GNSS-based localization system is typically expensive to deploy because the devices employing GNSS technology are relatively expensive. In addition, GNSS typically has limited accuracy in determining position. Without the use of specialized equipment, normal GNSS can determine subject locations with approximately five-meter accuracy in ideal reception conditions. In addition, GNSS position localization requires line of sight reception of satellite signals, thus limiting its use to an outdoor environment. GNSS systems are typically also limited in effectiveness when obstacles block line of sight to satellite positions such as in urban, steep terrain or forested locations. Furthermore, for certain applications that require high security, GNSS systems may compromise security requirements through their use of public satellite communications. Moreover, due to satellite communication delay, use of GNSS might not be an effective method for real-time tracking of moving sensors, particularly in some environments where GNSS reception is less than ideal.

Conventional non-GPS-based wireless positioning systems and methods also suffer from various drawbacks. One significant such drawback is that prior methods are often not suitable for deployment in large-scale networks, as their performance typically deteriorates rapidly as the network increases in size. The execution times required for sensor system operation and localization may not typically be fast enough for real-time applications, for example.

Disturbances in an environment of interest in which a wireless sensor network is deployed may affect the transmission and/or reception of wireless signals, such as unevenness and geographical obstacles in a terrain. A conventional approach to account for the geographical or other non-uniformity in the radio space in which a wireless sensor network is deployed may typically rely on manual system calibration by placing a mobile radio transceiver at selected locations within the wireless sensor network, taking measurements related to signal strengths of the mobile radio transceiver to establish calibration standards, and subsequently calibrating system-generated localization results based on the calibration standards.

In order for a wireless sensor network to allow location aware services, such as localization and intrusion detection, sensor nodes must be distributed in the target environment at specific locations during system setup in order to allow for spatially distributed sensing and detection across the target environment. A conventional approach is to plan the location of each particular sensor node (deployment mapping) and then follow the map layout during sensor nodes installation.

3. SUMMARY OF THE INVENTION

Certain features, aspects and embodiments disclosed herein are directed to a method of self-organizing sensor nodes in a wireless senor network (WSN); a method of localizing mobile nodes in a WSN; and a method of self-calibrating a WSN. Additional features, aspects and embodiments are discussed in more detail herein.

In accordance with a first aspect of the present invention, a method of self-organizing sensor nodes in a wireless senor network (WSN) is disclosed. In one embodiment, the WSN includes a plurality of sensor nodes in communication with a master node (e.g. a control station). The method includes distributing/installing the sensor nodes in an environment at predefined absolute locations, wherein two of the sensor nodes are anchor nodes of known ID and absolute locations.

Following the distributing/installing the sensor nodes, the method proceeds with configuring each of the sensor nodes to in turn broadcast consecutive messages at a plurality of predefined and incrementally increasing power levels. Next, the method proceeds with detecting receipt of the broadcasted messages at each of the sensor nodes and notifying the master node as to the identity of each sensor node receiving the broadcasted message and the power level at which it was received to define a detected neighbourhood for each sensor node.

Next, relative locations of the sensor nodes with the detected neighbourhoods are determined. Subsequently, the method proceeds with mapping relative locations of the sensor nodes by the master node based on results of the neighborhood detection and the known locations of the two anchor nodes.

In accordance with an additional aspect, a method of localizing mobile nodes in a WSN is disclosed. In one embodiment, the WSN includes a plurality of sensor nodes connected to a master node. The method includes broadcasting a first identification message from a mobile node at a first predefined transmit power level.

Following the broadcasting operation, the method proceeds with detecting receipt of the broadcasted message at each of the sensor nodes and sending a response message to the mobile node if the first message is received. Next, the method proceeds with estimating, based on a reception range of the first message, the location of the mobile node relative to the responding sensor node(s) if the first identification message is received.

If the first identification message is not received, the method proceeds with broadcasting a second identification message from the mobile node at a plurality of increasing second predefined transmit power levels. In one embodiment, the second predefined transmit power levels is higher than the first predefined transmit power level.

The method next proceeds with detecting receipt of the second message at each of the sensor nodes and sending a response message to the mobile node as to the identity of each sensor node receiving the second message and the second power level at which it was received. The method then proceeds with determining the location of the mobile node relative to the sensor nodes by triangulation.

Certain embodiments of the method of localizing mobile nodes in a WSN of the present invention may include one or more of the following features. In some embodiments, the method includes using an accelerometer and a compass integrated with the mobile node to supplement/enhance radio-based localization. In some embodiments, the method includes controlling the frequency of broadcasting the first and second identification messages by the mobile node based on the motion of the mobile node.

In accordance with another aspect, a method of self-calibrating a WSN is disclosed. The WSN includes a plurality of sensor nodes connected to a master node. In one embodiment, the method includes transmitting wireless signals at a known power level between each pair of neighboring sensor nodes among the plurality of sensor nodes. Next, the method proceeds with measuring received signal strength at each of the neighboring sensor nodes. Following the measuring operation, the method proceeds with determining a transmission coefficient for each pair of neighboring sensor nodes. Next, a translation vector is determined for each position between pairs of neighboring sensor nodes based on the corresponding transmission coefficients for the neighboring sensor nodes.

Certain embodiments of the method of self-calibrating a WSN of the present invention may include one or more of the following features. In some embodiments, the method further includes receiving a localized position for a mobile node located between a pair of neighboring sensor nodes, and applying a corresponding translation vector to the localized position to determine a calibrated localization position for the mobile node. In some embodiments, the method further includes repeating the transmitting, measuring and determining operations to account for at least one variation of wireless signal transmission in the WSN. In some embodiments, the method of self-calibrating a WSN eliminates the need for executing a complicated, time-consuming process of manually placing a mobile node or device at multiple locations in the WSN to establish calibration standards, as is typically required in prior art manual system calibration methods.

Further advantages of the invention will become apparent when considering the drawings in conjunction with the detailed description.

4. BRIEF DESCRIPTION OF THE DRAWINGS

The present invention will now be described with reference to the accompanying drawing figures, in which.

Similar reference numerals refer to corresponding parts throughout the several views of the drawings.

5. DETAILED DESCRIPTION OF THE INVENTION

Figure 1:
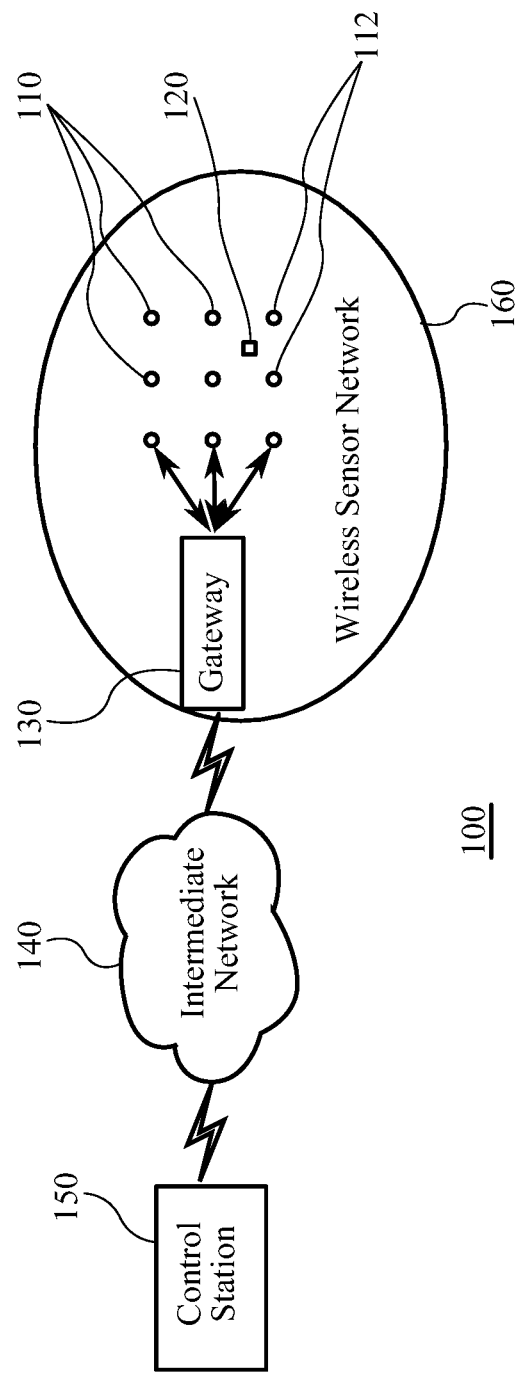
FIG. 1 is a schematic view of a wireless sensing system 100 according to an embodiment of the invention.

Referring to FIG. 1, a schematic view of a wireless sensing system 100 according to an embodiment of the invention is shown. Wireless sensing system 100 may advantageously permit a user to centrally operate from a base station or control station 150 (master node) to remotely access and control data collected by a wireless sensor network 160, such as by communication of such data through an intermediate network 140.

Wireless sensor network 160 includes a plurality of spatially distributed wireless sensor nodes 110 (hereinafter generally referred to as "PEGs 110") and a sensor communication gateway 130. In a preferred embodiment of the present invention, the networking topology for implementing the wireless sensor network 160 may be a mesh network topology, in which PEGs 110 may relay sensor data collected thereby to gateway 130 either directly or in "multi-hop" fashion involving automatic routing through several other PEGs 110 within mesh network 160. The routing of data in the reverse direction from gateway 130 to a particular PEG 110 may follow a similar direct or multi-hop fashion as above described. The protocol for handling the aforementioned automatic data routing within wireless sensor network 160 may follow the ZigBee® specification, other IEEE 802.15.4 specifications, or other known mesh network specifications. In alternative embodiments, wireless sensor network 160 may be arranged according to other known network topologies, such as topologies based on ring or hub type networks, or simply basic point to point transmission networks, for example.

In one embodiment of the invention, PEGs 110 each include routers and sensors, where the former include bi-directional wireless communications abilities that support mesh networking, and the latter include sensing ability, such as detecting any of a variety of parameters, including for example environmental (e.g., pressure, humidity etc.), motion or force (e.g., acceleration, rotation etc.), electromagnetic or electro-optical (e.g., magnetometers, radio signal antennae, cameras, etc.), and chemical or biological (e.g., chemical composition, presence or absence of agents, etc.) data, as are known in the art. In some embodiments PEGs 110 may also include an integrated power supply, which may include, but are not limited to self-powering with solar cells that may be advantageously adapted for off-grid sensor applications.

In one embodiment, PEGs 110 collectively create a reference sensor grid for the detection and localization of a mobile node 120 (hereinafter referred to as a "TAG"), which is capable of moving or being moved within wireless sensor network 160. That is, as TAG 120 moves about within wireless sensor network 160, the absolute or global location of TAG 120 may be periodically or substantially continuously detected and computed based on its relative or local location within wireless sensor network 160 and to specific PEGs 110. The detection and localization of TAG 120 may be based on a method of localizing mobile nodes in a wireless sensor network according to an embodiment of the invention, employing a novel dynamic transmit power variation ("DTPV") localization technique, the details of which are further discussed below.

In one embodiment of the invention, TAG 120 may include bi-directional wireless communications ability and sensing ability. In one exemplary embodiment, TAG 120 may have a compact form factor so as to be wearable by a person or other autonomous target of interest and may include sensors for sensing physiological and/or status data related to the person or target, such as heart rate and body temperature, for example. TAG 120 may also comprise a radio transceiver that may be operable to provide the functions of relaying the data collected by its sensors to at least one of PEGs 110 and/or control station 150 via gateway 130, and transmitting signals of varying, escalating power level to neighbouring PEGs 110 for self-localization of the TAG 120 using the DTPV localization technique, as will be later discussed.

Gateway 130 in turn operates as an interface to provide wireless sensor network 160 access to various external systems, such as control station 150, for relaying the data collected by or originating from individual PEGs 110, TAG 120, or gateway 130 itself to control station 150 for further data manipulation, such as performing triangulation, data analysis, transformation or storage, for example. The control of and access to wireless sensor network 160 by control station 150 is similarly interfaced through gateway 130. In one embodiment, a wireless coordinator functionality may be comprised in at least one device in the wireless sensor network which may have privileged network connectivity, such as central location in the network for example. In another embodiment, the gateway 130 may comprise such coordinator functionality. As shown in FIG. 1, the connection between gateway 130 and control station 150 may be established through an intermediate network 140 such as the Internet in this embodiment. In other embodiments, however, wireless sensing system 100 may include a plurality of wireless sensor networks 160 deployed in different environments or areas of interest. In such embodiments, the wireless sensing networks 160 may collectively form a wide area network (WAN), which may communicate with control station 150 directly or indirectly through another intermediate network such as the Internet. Intermediate network 140 in such embodiments may therefore include both a WAN and the Internet. It therefore will be understood by a person of ordinary skill in the art that the communication between gateway 130 and control station 150 may be established with various known networking protocols, and that intermediate network 140 may include both wired and wireless networks and/or public and private networks.

Self-Organization

In one aspect, the present invention provides a method of self-organizing a wireless sensor network 160 that may advantageously provide for the rapid deployment of a wireless sensor system 100 having large wireless sensor networks (e.g. wireless sensor network 160) comprising a large number of individual wireless sensors (e.g. PEGs 110). In one embodiment, the method of self-organizing a wireless sensor network may be applied in a wireless sensor system 100 as shown in FIG. 1. To clarify the advantages and benefits of the present method of self-organizing a wireless sensor network disclosed herein, a comparison to a conventional method of organizing wireless sensor networks as known in the art is provided.

In order for a wireless sensor network 160 to allow location aware services, such as localization and intrusion detection, sensor nodes 110 must be distributed in the target environment at specific locations during system setup in order to allow for spatially distributed sensing and detection across the target environment. A conventional approach is to plan the location of each particular sensor node 110 (deployment mapping) and then follow the map layout during sensor nodes 110 installation. In such a way, each device can be located on the map of the target area after inputting individual device identification and corresponding manually obtained installation locations. This process is, however, typically complicated and prone to errors. A simple error during device installation such as the mounting of an incorrectly identified device at a given location, or the mistranscription of a device identifier corresponding to an installation location can invalidate location readings of the entire wireless sensor system, for example. Typically the risk of such installation errors increases with the number of sensor nodes installed in the wireless sensor network 160, increasing significantly in the case of very large systems. Furthermore, device installation must be carefully planned beforehand and therefore does not allow for efficient and rapid system deployment.

Figure 2A:
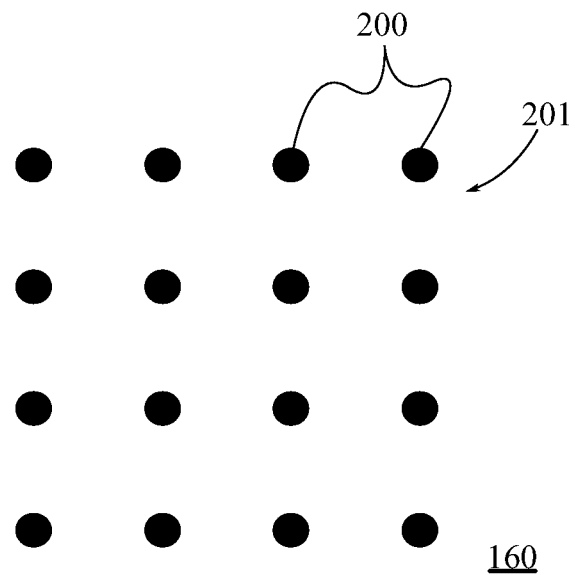
FIGS. 2A-2D are graphical representations of a method of self-organizing a wireless sensor network 160 according to an embodiment of the invention.
Figure 2B:
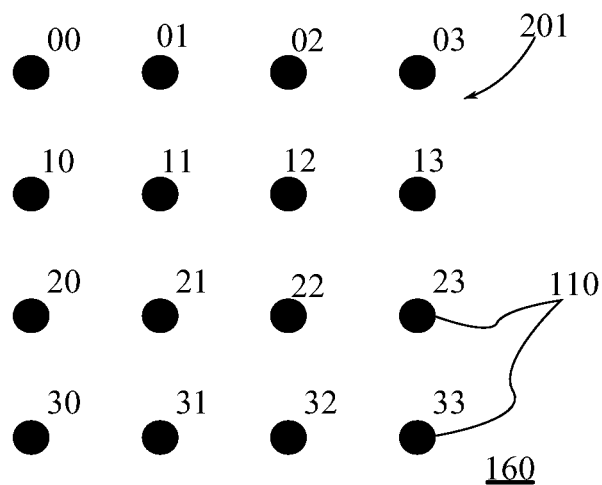

Addressing the need for rapid deployment of large wireless sensor networks, an embodiment of the present invention provides a method of self-organizing a wireless sensor network 160 that addresses limitations of the prior art. FIGS. 2A-2D illustrate graphical representation of a method of self-organizing a wireless sensor network 160 according to an embodiment of the invention. As shown in FIG. 2A, the locations 200 of PEGs 110 are first defined or mapped out to provide distributed coverage of an environment of interest 201 without the necessity of linking or reserving these PEG locations 200 for a particular PEG 110 associated with a particular unique PEG identifier, or ID. That is, as shown in FIG. 2B, randomly selected PEGs 110 in wireless sensor network 160 include PEGs 00-03, 10-13, 20-23, and 30-33 which may be installed at pre-selected locations in environment of interest 201 without requiring any correlation of the PEG ID with the particular installation location, provided that a PEG 110 is properly placed at each of the predefined locations 200 mapped out in FIG. 2A.

Figure 2C:
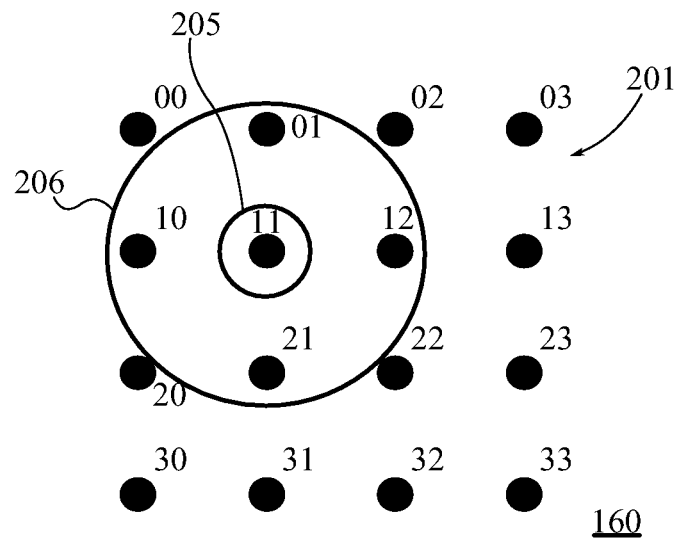

To determine precisely the locations and corresponding PEG IDs of the particular, individual PEGs 00-03, 10-13, 20-23, and 30-33 actually installed within target environment 201, the method of self-organizing a wireless sensor network 160 according to embodiments of the invention employs a neighborhood detection scheme. As shown in FIG. 2C, each of the PEGs 00-03, 10-13, 20-23, and 30-33 (e.g. PEG 11) may in turn be configured as a requesting PEG 11 to consecutively send or broadcast wireless signals at predetermined time intervals and at incrementally increasing transmission power levels (e.g. transmission power levels 205 and 206). In this case, the signals contain the PEG ID of requesting PEG 11 and the transmission power level being used. Each of the other PEGs (responding PEGs, e.g. responding PEGs 01, 10, 12, 21) that receive the broadcast signal from requesting PEG 11 may be configured to forward a signal confirming the fact of its receipt to a control station. Accordingly, for each particular requesting PEG such as PEG 11, a neighbourhood which identifies each of the responding PEGs, such as PEGs 01, 10, 12, 21, which received the signal broadcast by that particular requesting PEG 11, may be determined. In such a manner, due to the decay of radio signal strength and therefore detection ability with increasing distance of transmission, the neighbourhood of a particular requesting PEG 11 includes the responding PEGs 01, 10, 12, 21 located in the vicinity of the requesting PEG 11, and also the order of the responding PEGs 01, 10, 12, 21 based on the magnitude of the transmission power at which each of the responding PEGs 01, 10, 12, 21 first detected the signal broadcast by the requesting PEG 11. Accordingly, the relative proximity of each of the responding PEGs 01, 10, 12, 21 to the requesting PEG 11 may be hierarchically determined, based on the power level at which the responding PEGs 01, 10, 12, 21 first detected the requesting PEG 11's broadcast signal.

Figure 2D:
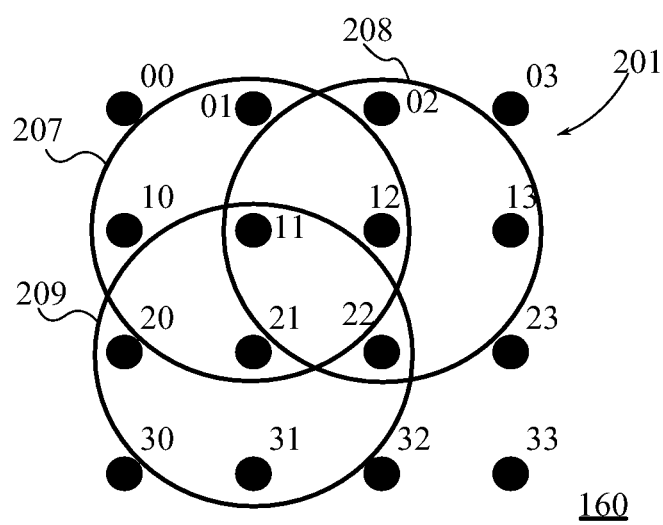

This iterative neighbourhood detection process is repeated until all PEGs 110 have completed their respective neighbourhood detection and the control station has received all corresponding neighbourhood detection data, from which the relative positions or locations of all PEGs 110 with respect to each other may be computed based at least in part on the overlapping relationships of neighbourhoods and the known locations of at least two PEGs, known as anchor nodes (e.g. anchor nodes 112 as shown in FIG. 1). An example of overlapping neighbourhoods employed to calculate the relative position of a particular PEG within a wireless sensor network of multiple PEGs 110 is illustrated in FIG. 2D, in which the corresponding neighbourhoods 207, 208, and 209 of respective PEGs 11, 12 and 21 may be used to aid in computing the relative location of PEG 11 within a wireless sensor network 160, for example. In particular, in such case, PEG 11 may be determined to be located directly adjacent to each of PEGs 12 and 21 in the relationship shown in FIG. 2D based on the common and unique PEG identifiers that were detected in the neighbourhoods 207, 208 and 209 corresponding to PEGs 11, 12 and 21 respectively.

Finally, the self-organization of a wireless sensor network to determine the absolute locations individually of PEGs 110 within a wireless sensor network 160 may be achieved by computing individual PEG absolute locations based on the relative locations of specific PEGs 00-03, 10-13, 20-23, and 30-33 with known PEG IDs within the wireless sensor network 160 (which is computed based on the neighbourhood detection scheme generally described in connection with FIGS. 2C and 2D) and their correlation with the known absolute PEG locations 200 as described in connection with FIG. 2A.

Figure 3A:
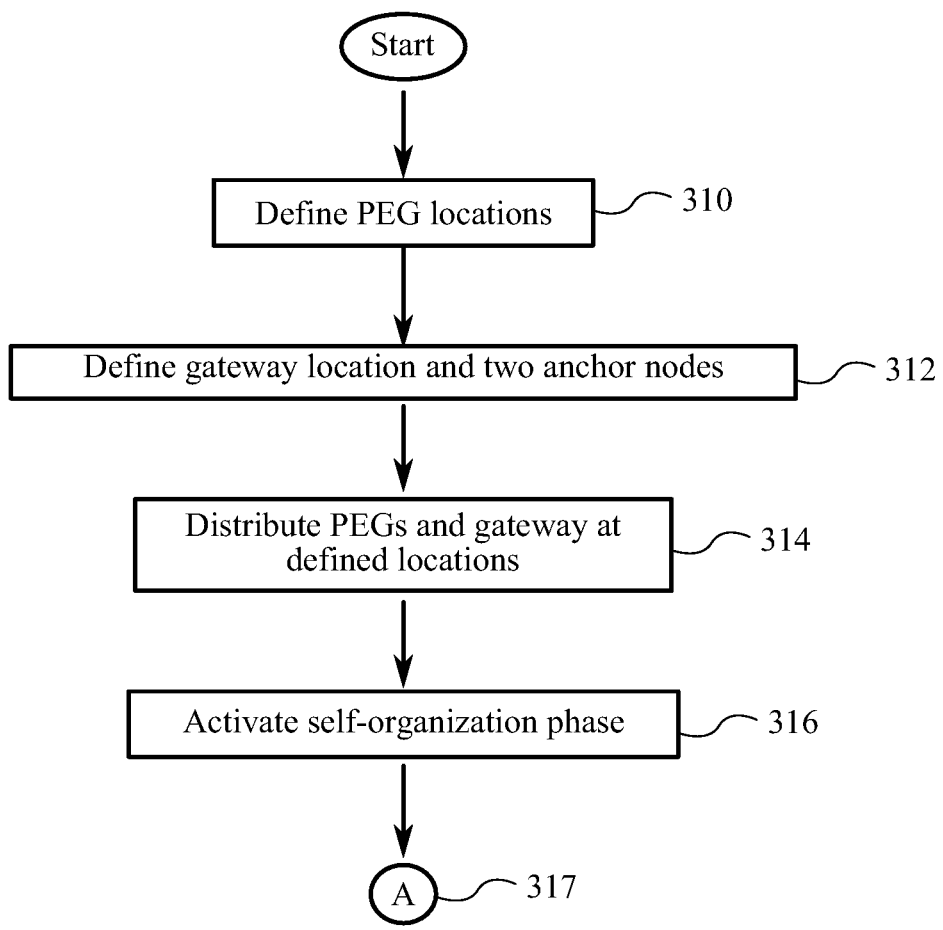
FIGS. 3A-3D is a flow diagrams corresponding to a method of self-organizing a wireless sensor network 160 according to an exemplary embodiment of the invention.

Having broadly described the above method of self-organizing a wireless sensor network according to an embodiment of the invention, the details of the method are now described with reference to FIGS. 3A-3D, which illustrate flow diagrams corresponding to a method of self-organizing a wireless sensor network according to an exemplary embodiment of the invention. Referring to FIG. 3A, the exemplary method of self-organizing a wireless sensor network begins at operation 310 by defining a set of PEG locations 200 in an environment of interest 201, which may include a terrain, the exterior or interior of a building structure, an industrial facility or an urban area, for example.

Next, at operation 312, the exemplary method of self-organizing a wireless sensor network proceeds with defining or determining the locations of a gateway (e.g. gateway 130 as shown in FIG. 1) and two anchor nodes (PEGs 110 with known absolute locations and associated identifications or PEG IDs, e.g. anchor nodes 112). The gateway 130 and two anchor nodes 112 may advantageously provide known reference points for the subsequent self-organization of other PEGs 110 (with previously unknown locations) in the wireless sensor network 160.

Next, at operation 314, the gateway 130 and PEGs 110 are distributed or installed in the environment of interest at their respective locations predefined at operations 310 and 312. Following the completion of distribution of PEGs 110 and the gateway 130, the exemplary method of self-organizing a wireless sensor network 160 proceeds with the activation of a self-organization phase, shown at operation 316.

Figure 3B:
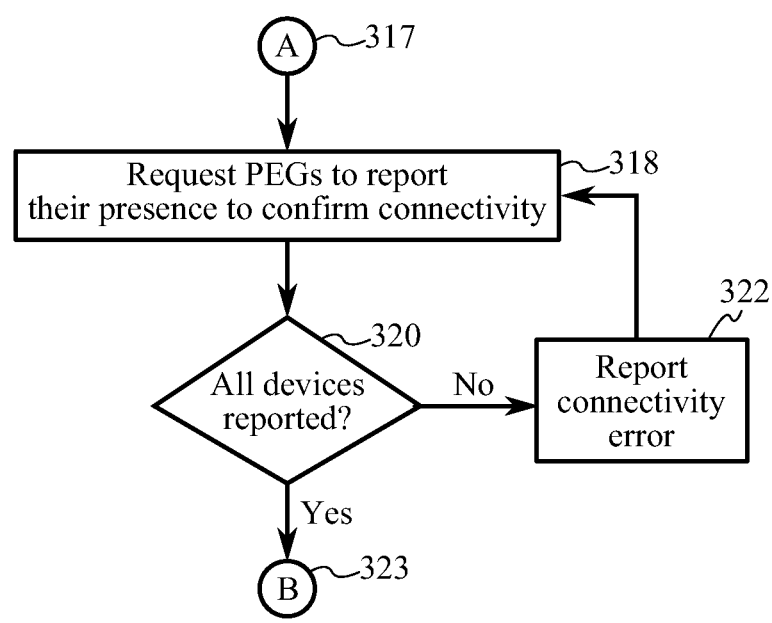

Optionally, certain embodiments of the method of self-organizing a wireless sensor network 160 may include PEG connection validation steps, which may be advantageously employed to ensure that all PEGs 110 within a wireless sensor network 160 are active or are capable of establishing connection. FIG. 3B shows a flow diagram of optional PEG connection validation steps applicable to a method of self-organizing a wireless sensor network 160 according to an embodiment of the invention. The PEG connection validation operations may follow the activation of a self-organization phase operation 316 as shown in FIG. 3A, marking the beginning of the self-organization phase. Alternatively, exemplary PEG connection validation operations may be performed following the distribution or installation of PEGs 110 and gateway 130 at operation 314, and before the activation of a self-organization phase at operation 316.

The method of PEG connection validation as shown in FIG. 3B begins at operation 318 with requesting PEGs 110 to report their presence, such as to a control station (typically through a gateway 130), to confirm their connectivity with the wireless sensor network. The process of operation 318 is repeated until all PEGs 110 have reported their connectivity, as shown at operation 320. If the device connectivity of all PEGs 110 has been reported, the method of self-organizing a wireless sensor network 160 may proceed with additional self-organization phase steps, as indicated by reference numeral 323. If the device connectivity of all PEGs 110 has not been properly reported, however, then a connectivity error may be reported, as shown at operation 322, and operation 318 may be repeated.

Figure 3C:
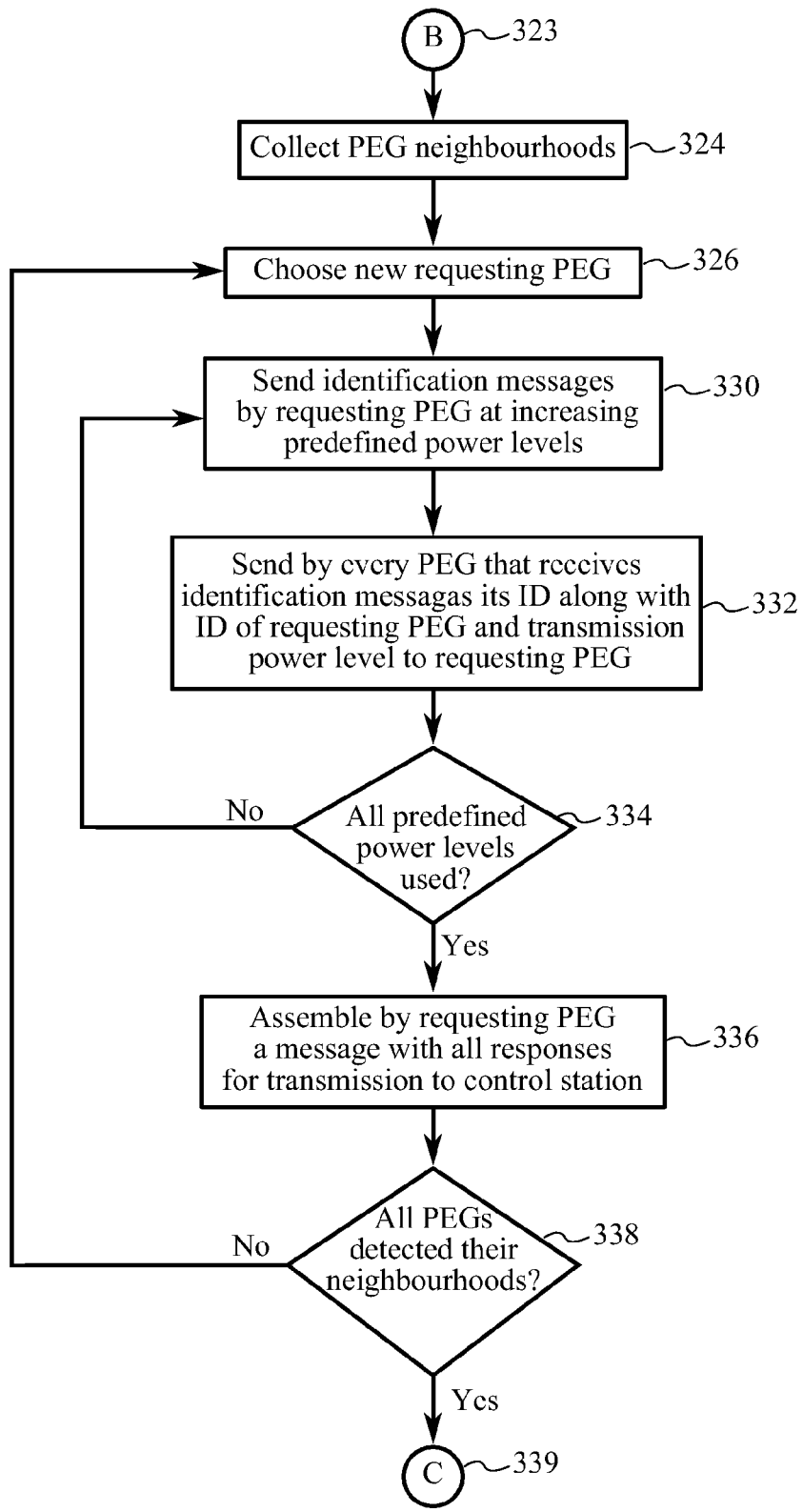

FIG. 3C shows a flow diagram of operations for a self-organization phase for a method of self-organizing a wireless sensor network 160 according to an embodiment of the invention. The self-organization phase may desirably be activated from a control station (e.g. control station 150). The self-organization phase operations as shown in FIG. 3C may follow from the activation of a self-organization phase operation 316 as shown in FIG. 3A, or in an alternative embodiment, follow from the PEG connection validation process as shown in FIG. 3B.

Referring to FIG. 3C, the neighbourhood detection steps of a self-organization phase for a method of self-organizing a wireless sensor network 160 begins with collecting location data relating to PEG neighbourhoods as shown at operation 324, following which a new requesting PEG is selected (e.g. requesting PEG 11 as shown in FIG. 2C), as shown at operation 326.

Next, at operation 330, the selected requesting PEG 11 transmits, sends or broadcasts identification messages at incrementally increasing, predefined or predetermined power levels. Each identification message includes a description or identification of the power level used to broadcast that identification message and information regarding the source of the message, such as the PEG ID of the requesting PEG 11 that broadcasted the identification message.

The range of predefined transmit power levels required to transmit the identification messages for neighbourhood detection may depend on factors such as the particular wireless sensor system 100 and the distribution of PEGs 110. For example, the starting predefined transmit power level may be lower in a wireless sensor network 160 with densely distributed PEGs 110 as compared to one with sparsely distributed PEGs 110. In one preferred embodiment, the range of predefined transmit power levels used may range from approximately −80 dBm to approximately +4 dBm. In one preferred embodiment, the predefined transmit power levels may be at −60 dBm, −10 dBm, 0 dBm, 4 dBm, for example. The predefined transmit power levels may be changed dynamically during run-time.

Following the broadcasting of identification messages by a requesting PEG 11, all other PEGs 110 are configured to receive, detect or listen for the identification messages broadcasted by the requesting PEG 11, and upon successful detection, to send or transmit a responding message to the requesting PEG 11, as shown at operation 332. The responding message may include information on the power level at which the such identification messages were broadcasted and received, the PEG ID of the requesting PEG 11, and the PEG ID of the responding PEG (e.g. responding PEGs 01, 10, 12, 21) which has successfully detected the broadcasted identification messages.

After a predetermined interval or "round" in which the selected requesting PEG 11 has broadcasted an identification message and waited for a corresponding response message at a first predetermined power level, the neighbourhood detection operations of the self-organization phase proceed to determine if the identification messages have been broadcasted at all of the predefined transmit power levels, as shown at operation 334. If not, the method returns to operation 330 at which the requesting PEG 11 is further configured to broadcast additional identification messages at an increased, predetermined power level and the process is repeated until the requesting PEG 11 has completed neighbourhood detection at all predefined transmit power levels (e.g. power levels 205, 206 as shown in FIG. 2C), at which case the method proceeds to operation 336.

The time interval between each round of identification messages broadcasting may be hardware dependent, and for example, may be defined by the hardware delay required for a requesting PEG 11 to transmit an identification message at a predefined transmit power level and receive a corresponding response message at that predefined transmit power level. The time interval between each round of identification messages broadcasting may also depend on the time required to configure a requesting PEG 11 to transmit at a predefined transmit power level different from that of the immediately preceding round.

Following the completion of neighbourhood detection by the selected requesting PEG 11, a reporting message assembling or including all of the responding messages received by the requesting PEG 11 is transmitted by the requesting PEG 11 to control station 150, as shown at operation 336, signifying the completion of neighbourhood detection by the requesting PEG 11 which transmitted the reporting message. In an alternative embodiment, the responding PEGs 01, 10, 12, 21 in operation 332 may alternatively send a responding message directly to a control station 150, such as through a gateway node 130, rather than sending the responding message to the requesting PEG 11. In such case, the method may optionally omit operation 336 in the event that the control station 150 may have received all responding messages from responding PEGs 01, 10, 12, 21 directly, in which case a reporting message sent by the requesting PEG 11 may be duplicative in providing information to the control station about which PEGs 110 have responded and at what power levels.

Next, at operation 338, the neighbourhood detection operations for the self-organization phase proceeds to determine if all PEGs 110 in the wireless sensor network 160 have detected their neighbourhoods. If not, the neighbourhood detection operations 330, 332, 334, 336 are repeated until all of the PEGs 110 in the wireless sensor network 160 have reported detection of their neighbourhoods, at which point the method of self-organizing a wireless sensor network 160 proceeds to further computation operations for the self-organization phase, as pointed to by reference numeral 339.

Figure 3D:
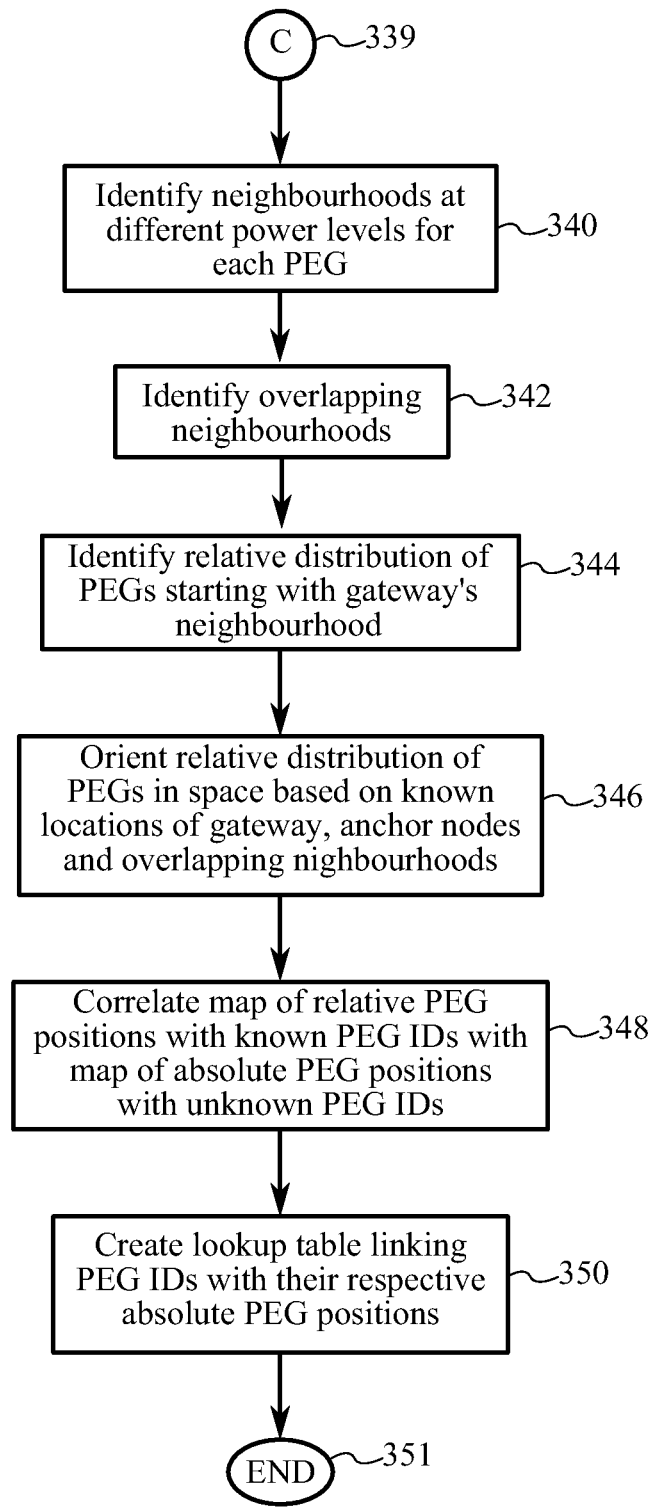

FIG. 3D shows a flow diagram illustrating the continuation of the self-organization phase for a method of self-organizing a wireless sensor network 160 from FIG. 3B. Following the completion of neighbourhood detection by all PEGs 110 at operation 338 from FIG. 3C, the neighbourhoods detected at different power levels are identified for each PEG 110, as shown at operation 340.

Next, at operation 342, overlapping neighbourhoods with detection of common PEG IDs are identified from all of the neighbourhoods identified at operation 340.

Following the identification of overlapping neighbourhoods, the method of self-organizing a wireless sensor network 160 proceeds to identify the relative distribution in space of the PEGs 110 starting with the gateway 130's neighbourhood, as shown at operation 344. Such identification of the relative spatial distribution may be determined at least in part by the relative proximity of responding PEGs (e.g. PEGs 01, 10, 12, 21) to a requesting PEG (e.g. requesting PEG 11) which may be determined by the power level at which a responding PEG first reported reception of a message from the requesting PEG 11, as well as the identity of the common responding PEGs between overlapping neighbourhoods.

Next, at operation 346, the relative distribution or location of PEGs 110 in space is oriented or mapped based on the known absolute locations of the gateway 130 and the anchor nodes 112 determined at operation 312, and the overlapping neighbourhoods determined at operation 342, resulting in the creation of a wireless sensor network 160 map of relative PEG positions with known PEG IDs.

Next, at operation 348, the map of relative PEG positions with known PEG IDs in wireless sensor network 160, determined at operation 346, is correlated or combined with the map of absolute PEG positions 200 with unknown or unlinked PEG IDs determined from operation 310. Such combined relative and absolute PEG positions and known PEG IDs may thereafter be used to create a look-up table linking PEG IDs with their respective absolute PEG positions at operation 350. Such lookup table of PEG IDs and positions and wireless sensor network 160 map may be used to support detection and localization operations of the wireless sensor network 160 such as described in further embodiments of the invention below.

With reference to the description above, embodiments of the method of self-organizing a wireless sensor network 160 may desirably provide at least one of the following advantages over prior art methods:

1. Improved speed and/or accuracy of PEG organization as compared to manually linking PEGs 110 to physical locations in prior art methods and systems;
2. Improved speed of wireless sensor system 100 deployment as compared to traditional deployment mapping in which the installation and location of each PEG 110 must be carefully planned and executed without allowance for error;

3. Organization of a wireless sensor network 160 using only two anchor nodes 112 with known location; and
4. Organization of a wireless sensor network 160 without requiring direct transmission contact between each and every PEG 110 and a reference node as typically required in traditional methods of PEG organization.

Localization

In another aspect, the present invention provides a method of localizing mobile nodes or TAGs (e.g. TAG 120) within a wireless sensor network 160 comprising a plurality of fixed sensor nodes or PEGs 110 that in some embodiments may desirably provide for a more robust, accurate and/or lower power mobile node localization technique in comparison with prior art systems and methods. In order to determine the relative location (with respect to PEGs 110) and absolute location of a mobile node (e.g. TAG 120) within a wireless sensor network 160, embodiments of the method for localizing mobile nodes within a wireless sensor network 160 of the present invention may employ a Dynamic Transmit Power Variation ("DTPV") technique.

According to the DTPV technique, a TAG 120 may be configured to transmit or broadcast an identification message at incrementally increasing predefined transmit power levels and to listening for and detecting a response from neighbouring reference PEGs which send such a response upon their receipt of the identification message from the TAG 120. Accordingly, the relative location of a TAG 120 with respect to the PEGs 110 within a wireless sensor network 160 may be determined dynamically based on its proximity or distance to one or more reference PEGs 110. Due to the attenuation of signal strength with increasing distance, the power level at which a particular PEG 110 first receives an identification message from a TAG 120 may thereby be correlated to the proximity of the TAG 120 to the PEG 110, or the distance between the TAG 120 and the PEG 110, thus allowing the relative location of the TAG 120 to be determined.

Figure 4:
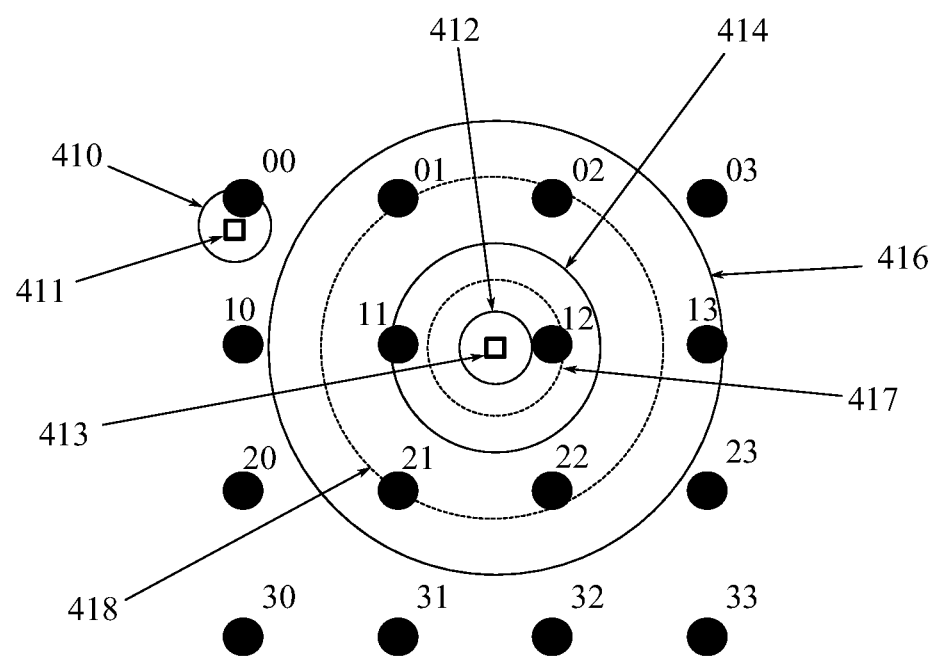
FIG. 4 is a graphical representation of a method of localizing mobile nodes within a wireless sensor network 160 according to one exemplary embodiment of the invention.

In one embodiment, such as shown in FIG. 4, which illustrates graphical representation of the method of localizing mobile nodes within a wireless sensor network 160 according to one exemplary embodiment, if an identification message transmitted by a broadcasting TAG 411 at its lowest predefined transmit power level is successfully received by a neighbouring PEG 00, the TAG 411 may be localized (that is its relative location determined) based on its near proximity to the reference PEG 00 rather than by calculations based on the distance from the TAG 411 to one or more reference PEGs 110. Namely, in a preferred embodiment, the lowest predefined transmit power level may be selected or configured such that an identification message transmitted at such power level has a very limited reception range such as a reception range of only a few meters, or less than about 10 meters, for example. Therefore, a response from a reference PEG 00 to an identification message transmitted at the lowest power level signifies that the broadcasting TAG 411 is within a very limited radius of the responding reference PEG 00, or may be deemed to be in immediate proximity to the PEG 00. Given the immediate proximity of the responding PEG 00 to the broadcasting TAG 411, the known absolute location of the responding PEG 00 (such as defined at step 310 in FIG. 3B) may be reported to be the location of the broadcasting TAG 411. Therefore, in such case the localization of the broadcasting TAG 411 is said to be based on its proximity to a reference PEG 00, without having to actually calculate its distance from one or more reference PEG locations, such as by triangulation for example.

However, if there are no responses from any reference PEGs 110 to an identification message transmitted by a TAG (e.g. TAG 413 as shown in FIG. 4) at its lowest power level (e.g. power level 412), this would signify that the broadcasting TAG 413 is not within immediate proximity of a single reference PEG 110, but is instead located somewhere between a plurality of PEGs 110 (such as TAG 413 shown between PEGs 11 and 12). In such an instance, further identification messages are transmitted by the broadcasting TAG 413 at increasing predefined transmit power levels (e.g. power levels 414 and 416) until an identification is broadcast at sufficient power to reach a desired or sufficient number of reference PEGs 110 (such as at least three PEGs) such that the location of the TAG 413 may be determined based on triangulation from the locations of the responding PEGs (e.g. PEGs 01, 02, 11, 12, 13, 21, and 22 responding to TAG 413).

Figure 5A:
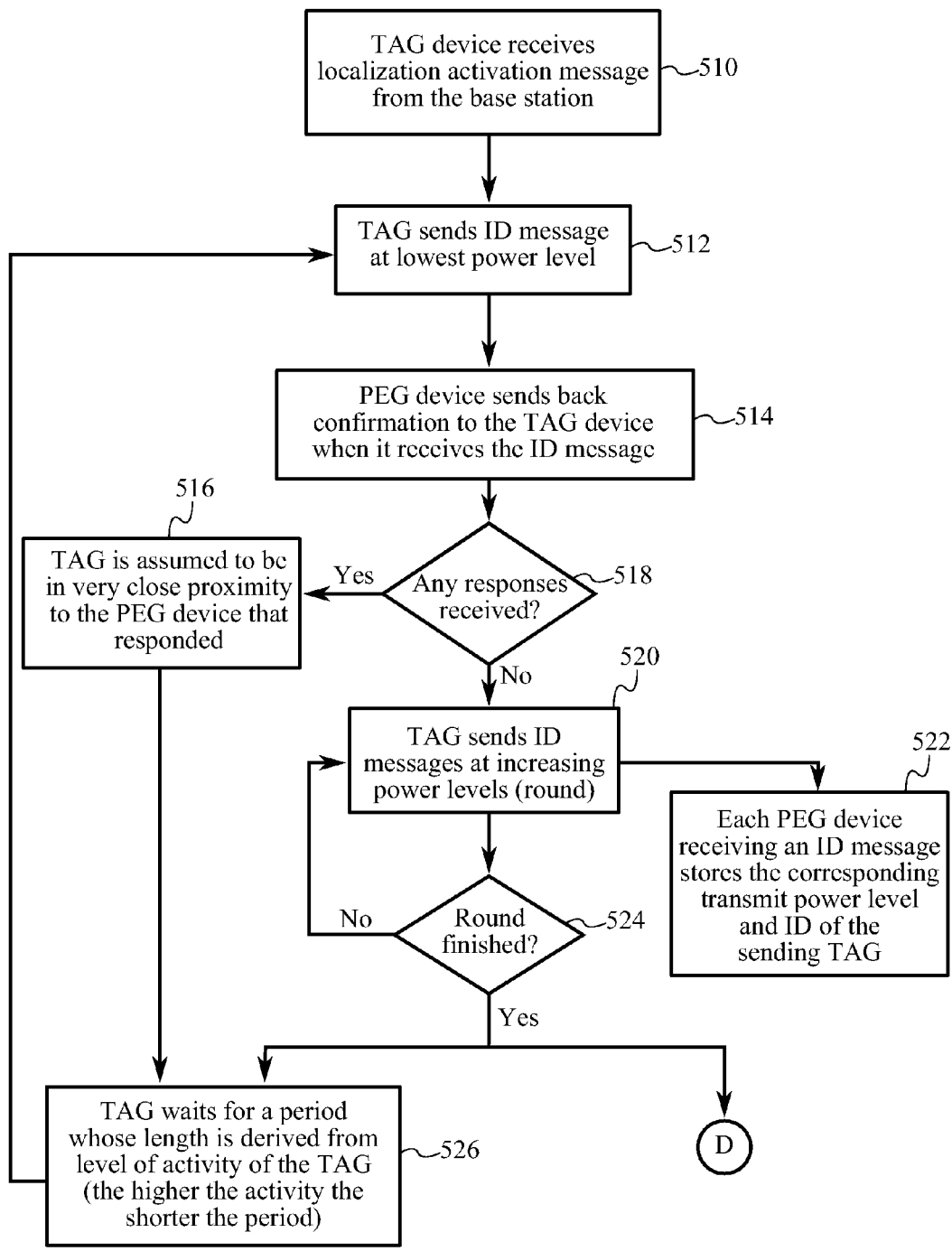
FIGS. 5A-5B are flow diagrams corresponding to a method of localizing mobiles nodes within a wireless sensor network 160 according to an embodiment of the invention.

Having broadly described the method of localizing mobile nodes within a wireless sensor network 160 according to embodiments of the invention, the details of the method according to one aspect of the invention may now be described with reference to FIG. 4 and FIGS. 5A and 5B, which illustrate flow diagrams of operations according to a method of localizing mobile nodes within a wireless sensor network 160 according to an embodiment of the invention. Referring now to FIG. 5A, the method of localizing mobile nodes within a wireless sensor network 160 according to one embodiment begins with a mobile node (e.g. TAG 411) receiving a localization activation message from a base station or control station (e.g. control station 150), signifying the beginning of the TAG localization process, as shown at operation 510.

Once a TAG 411 has been instructed to begin the localization process, the instructed TAG 411 is configured to send or broadcast an identification message at incrementally increasing, predefined or predetermined power levels, and may begin by broadcasting the message at the lowest predefined transmit power level, as shown at operation 512. One exemplary embodiment is illustrated in FIG. 4, which is a graphical representation of the method of localizing mobile nodes within a wireless sensor network 160. An instructed TAG 411 may begin to broadcast an identification message at the first, lowest predefined transmit power level 410 which defines a detection range within which the identification message may be detected by a PEG (e.g. PEG 00). The identification messages include a description or information on the transmit power level used to broadcast such identification messages and information regarding the source of the message, such as the TAG ID of the broadcasting TAG 411.

Next, at operation 514, all PEGs 110 are configured to receive, detect or listen for the identification messages transmitted by the broadcasting TAG 411, and upon successful detection, to send or transmit a responding message to the broadcasting TAG 411, as shown at operation 514. The responding message may desirably include any information required to confirm the successful receipt of the identification message. In one embodiment, the responding message may contain information on the power level at which the identification messages were broadcasted and received, the TAG ID of the broadcasting TAG 411, and the PEG ID of the responding PEG 00 which has successfully detected the broadcasted identification messages. For example, as shown in FIG. 4, PEG 00 is within the detection range of the identification message broadcasted by TAG 411 at the predetermined power level 410. Therefore, upon successful detection, PEG 00 responds by sending a responding message to TAG 411 confirming detection and preferably identifying TAG 411 as the source and PEG 00 as the responding PEG, as well as the power level 410 at which the message was detected.

Next, at operation 518, the method of localizing mobile nodes within a wireless sensor network 160 proceeds to determine if any responding messages have been received in response to the identification message broadcasted at the first predefined transmit power level 410. For example, in the embodiment as shown in FIG. 4, after broadcasting an identification message at the first or lowest power level 410, TAG 411 may determine if any surrounding PEGs 110 is within the detection range of the identification message transmitted at power level 410 by the receipt, if any, of corresponding responding messages.

At operation 518, if a responding message has not been received in response to the identification message broadcasted at the first predefined transmit power level (e.g. power level 412 broadcasted by TAG 413), the method proceeds to operation 520, at which the TAG 413 is further configured to broadcast identification messages at increasing predefined transmit power levels at predetermined time intervals (e.g. power levels 414 and 416), and the process is repeated over multiple iterations or "rounds" through operations 520 and 524 until identification messages have been broadcasted at all corresponding predefined transmit power levels. For example, in the embodiment shown in FIG. 4, a broadcasting TAG 413 broadcasts an identification message through three rounds at incrementally increasing power levels until identification messages have been broadcasted at predefined transmit power levels 412, 414, and 416, because no PEGs 110 were within the detection range of its first predefined transmit power level 412. The number of rounds may be dynamically changed at run-time depending on the level of TAG 413 localization precision required.

Corresponding to the broadcast of identification messages at increasing predefined transmit power levels 414 and 416 by the TAG 413 at operation 520, each PEG (e.g. PEGs 01, 02, 11, 12, 13, 21, and 22) that receives the identification messages is configured to store information regarding the transit power levels at which they are transmitted and received and the identification information regarding the broadcasting TAG 413 (e.g. TAG ID), as shown at operation 522

Figure 5B:
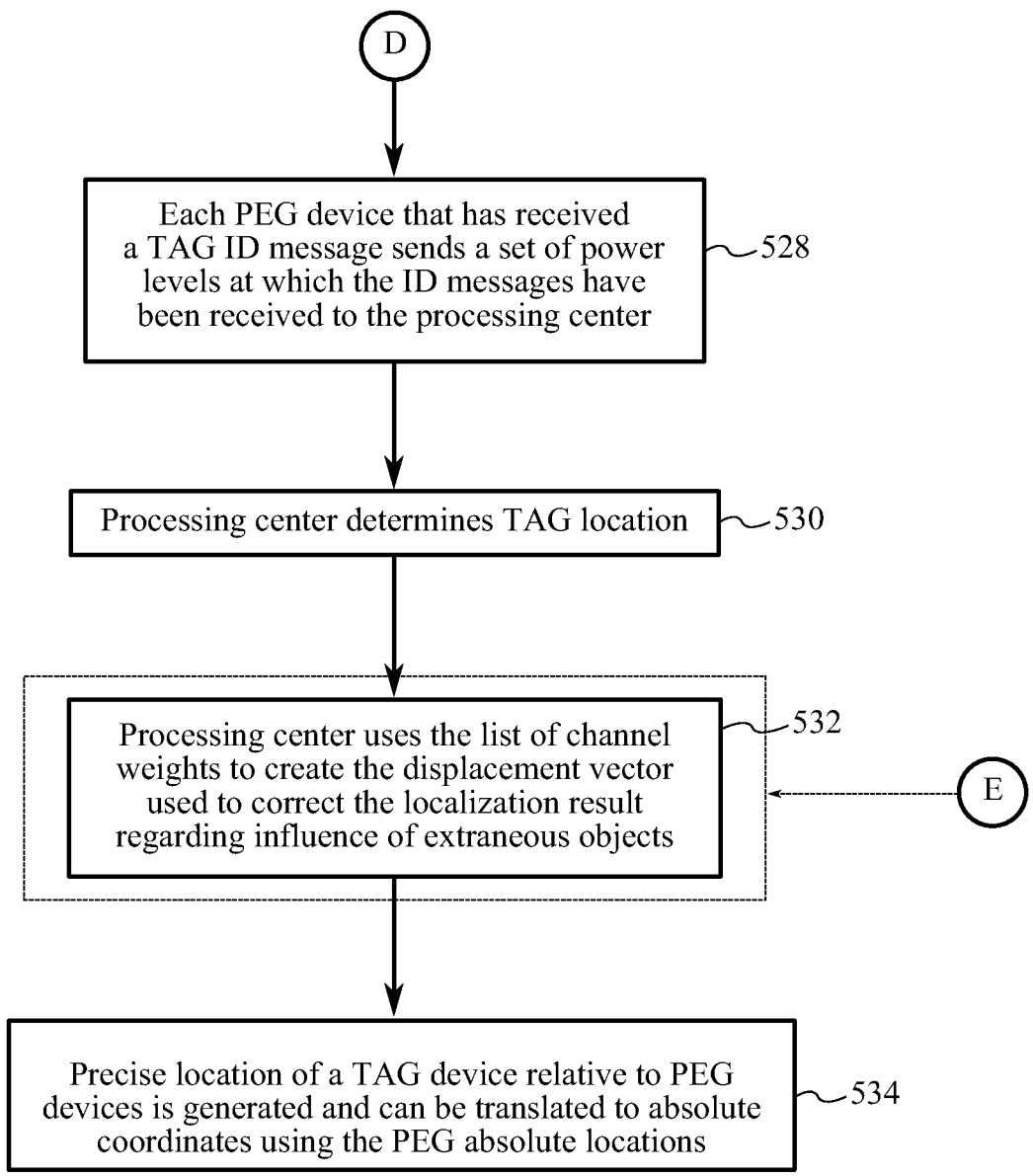

Following the completion of the broadcast of identification messages at all predefined transmit power levels at operation 524, the method proceeds to further localization operations as shown in the flow diagram of FIG. 5B.

At operation 528, each responding PEG (e.g. PEGs 01, 02, 11, 12, 13, 21, and 22) that has received an identification message broadcast by the TAG 413 sends or transmits a reporting message to a processing center or control station (e.g. control station 150) which in some embodiments may be transmitted through a gateway 150 and/or an intermediate network 140 as illustrated in the exemplary embodiment shown in FIG. 1. The reporting message may include information regarding the power levels (e.g. power levels 414, 416) at which individual identification messages have been transmitted and received, and identification information regarding the reporting PEGs 01, 02, 11, 12, 13, 21, and 22 (e.g. PEG ID) and the broadcasting TAG 413 (e.g. TAG ID).

Distance from Reference

Next, at operation 530, the processing center or control station 150 is configured to determine the location of the TAG 413 based on the receipt of the reporting messages transmitted by the reporting PEGs 01, 02, 11, 12, 13, 21, and 22 at operation 528. In a preferred embodiment, the relative location of the TAG 413 may be determined based on its distance from the reporting reference PEGs 01, 02, 11, 12, 13, 21, and 22 using triangulation. For example, referring again to FIG. 4, the identification messages transmitted at a second predefined transmit power level 412 and a third predefined transmit power level 414 reach the groups of PEGs 11 and 12, and PEGs 01, 02, 11, 12, 13, 21 and 22, respectively. As the predefined transmit power levels may be translated into corresponding distances based on the generally known attenuation of wireless signals over distance, the location of TAG 413 relative to these reference PEGs 01, 02, 11, 12, 13, 21, and 22 may be determined by triangulation based on its relative distance from each of the reference PEGs 01, 02, 11, 12, 13, 21, and 22. The relative distance of a particular responding PEG may be calculated by reference to the detection range of the lowest power level at which the PEG received the identification message from the TAG 413.

Following operation 530, the precise location of the TAG 413 relative to the reporting reference PEGs 01, 02, 11, 12, 13, 21, and 22 may be translated into absolute location coordinates based on the known absolute locations of each PEG (such as may be determined from the layout of PEG locations 200 as planned prior to installation of the network of PEGs 110, as at operation 310 of the method of wireless sensor organization shown in FIG. 3).

Proximity to Reference

Referring again to operation 518, if a responding message has been received in response to the identification message broadcasted by the TAG (e.g. TAG 411) at the first (and lowest) predefined transmit power level (e.g. power level 410), the broadcasting TAG 411 may be assumed to be in very close proximity to the responding PEG 00, as shown at operation 516, and therefore no further broadcasting of messages by the broadcasting TAG 411 at increasing power levels is required (operations 520 and 524) and no triangulation needs to be performed at subsequent operation 530 in order to determine the position of the TAG 411. Instead, following operation 516 the method proceeds to subsequent localization operations as shown at operations 528, 530 and 534 at which the relative and absolute locations of the broadcasting TAG 411 may be estimated based on its close proximity to the responding reference PEG 00, the absolute location of which is known. For example, as shown in FIG. 4, PEG 00 falls within the detection range of the identification message transmitted by TAG 411 at the first and lowest predefined transmit power level 410. The known absolute location of PEG 00 may be said to be the location of the TAG 411, with a level of localization precision correlating to the maximum distance that the identification message broadcasted at first predefined transmit power level 410 may be detected by a PEG 110.

As a TAG (e.g. TAG 411) is typically mobile with a dynamically changing position within a wireless sensor network 160 formed by reference PEGs 110, the method of localizing mobile nodes within a wireless sensor network 160 in the embodiment shown in FIGS. 5A and 5B desirably includes an iterative TAG identification message broadcasting process. As shown at operation 526, after a predetermined period has elapsed following the broadcasting TAG 411 completing the transmission of an identification messages at all the required predefined transmit power levels, the localization method returns to operation 512 at which the TAG 411 re-broadcasts its identification messages beginning again at the first, lowest predefined transmit power level, thereby allowing the location of a moving TAG 411 within a wireless sensor network 160 to be dynamically tracked using multiple iterative localization operations.

Certain embodiments of the method of localizing mobile nodes within a wireless sensor network 160 according to the present invention may also include one or more of the below-described features. The degree of accuracy in absolute location desired for TAG 411 localization may be configured based on the predetermined transmit power levels of a broadcasting TAG 411. For example, in one embodiment, if the accuracy of TAG 411 localization is desired to be within approximately one (1) meter of the actual location of the TAG 411, then the first (lowest) predefined transmit power level 410 of the broadcasting TAG 411 may be configured such that an identification message transmitted at such first power level 410 may only be detected by a reference PEG 00 that is within approximately one (1) meter of the broadcasting TAG 411. Further, the level of TAG localization (e.g. TAG 413) accuracy desired may be configured based on the number and increment size of predetermined transmit power levels of broadcasting TAG 413, without modifications to TAG 413 hardware or firmware being required. For example, in the embodiment as shown in FIG. 4, the localization precision of TAG 413 may be increased by configuring TAG 413 to broadcast identification messages at predefined transmit power levels 417 and 418 in addition to predefined transmit power levels 413, 414, and 416, resulting in smaller increments of increase from one power level to another. Accordingly, it follows that a greater number and/or narrower spacing of increasing transmit power levels translates to a more accurate TAG 411 localization.

In an alternative embodiment to the one described with reference to FIGS. 4, 5A and 5B, once a TAG (e.g. TAG 413) has been instructed to begin the localization process at operation 510, instead of broadcasting one identification message per incrementally increasing, predefined transmit power level at power levels 412, 414, and 416 (operations 512 and 520), the instructed TAG 413 may alternatively be configured to consecutively send or broadcast several identification messages at each predefined transmit power level.

Such consecutive broadcasting of identifications messages at each predefined transmit power level may advantageously account for interferences in the radio space in which TAGs 411 and 413, and PEGs 00-03, 10-13, 20-23, and 30-33 operate. As earlier discussed with reference to operation 530 and FIG. 4, the relative distance of a particular responding PEG may be calculated by reference to the detection range of the lowest power level at which the PEG received the identification message from TAG 413. Due to the effect of radio interference, however, an identification message transmitted by TAG 413 otherwise detectable by a PEG (e.g. PEG 11) at a predefined transmit power level (e.g. power level 414 for PEG 11) may instead be received at the next incrementally increased predefined transmit power level 416, resulting in imprecise localization of TAG 413 relative to PEG 11 based on transmit power level 416 rather than transmit power level 414.

To account for the effect of radio interference as described, an embodiment of the method of localizing mobile nodes within a wireless sensor network 160 may include TAG localization by configuring a TAG (e.g. TAG 413) to consecutively send or broadcast several identical identification messages at every one of the predefined transmit power levels 413, 414 and 416, to thereby increase the chance of successful detection by a reference PEG (e.g. PEG 11) of an identification message broadcasted at the lowest detectable predefined transmit power level (e.g. power level 414 for PEG 11). For example, an identification message broadcasted once at predefined transmit power level 414 which is otherwise not received by PEG 11 due to radio interference may instead be received by PEG 11 two out of three times, for example, if broadcasted consecutively in three successions.

In some embodiments, consecutive broadcasting of multiple identifications messages at each predefined transmit power level may advantageously provide for higher TAG localization sensitivity. For example, referring to FIG. 4, TAG 413 may be configured to broadcast identification messages at three predefined, escalating, transmit power levels 412, 414, and 416 and to consecutively broadcast the identification message at each of the power levels 412, 414, and 416 three times, resulting in nine possible outcomes of which either one, two or all three of the identification messages broadcasted at each of the power levels may be correctly received by a reference PEG, and for the three power levels. These nine possible outcomes may effectively be seen as dividing the range or power increment between the three power levels 414, 414 and 416 into nine virtual sub-ranges 1-9, where a lower numbered sub-range corresponds to a lower power transmission range/level:

1. All three identification messages transmitted at the lowest power level 413 correctly received at that power level;
2. Two of three identification messages transmitted at the lowest power level 413 correctly received at that power level;
3. One of three identification messages transmitted at the second power level 413 correctly received at that power level;
4. All three identification messages transmitted at the second power level 414 correctly received at that power level;
5. Two of three identification messages transmitted at the second power level 414 correctly received at that power level;
6. One of three identification messages transmitted at the second power level 414 correctly received at that power level;
7. All three identification messages transmitted at the third power level 416 correctly received at that power level;
8. Two of three identification messages transmitted at the third power level 416 correctly received at that power level; and
9. One of three identification messages transmitted at the third power level 416 correctly received at that power level.

According to the above-noted sub-ranges, the relative distance of reference PEGs (e.g. PEGs 11 and 12) within the detection range of an identification message broadcasted at a certain power level may be further distinguished. For example, reference PEG 12 receiving the identification message at the power level 414 all three times (sub-range 4) may be computed to be relatively closer to TAG 413 than reference PEG 11, which receives the identification message at the power level 414 two out of three times (sub-range 5). The above-described nine virtual sub-ranges created from configuring TAG 413 to broadcast identifications messages consecutively for three time at each of the three predefined transmit power levels may advantageously have the similar effect of improved TAG localization precision/sensitivity as configuring TAG 413 to broadcast identification messages at nine separate predefined transmit power levels, but without the need to configure TAG 413 for message broadcasting at nine power variations, allowing relatively faster localization.

In one embodiment, in order to limit radio traffic and the associated potential for interference, the PEGs 110 and TAGs (e.g. TAG 112 in FIG. 1 or TAGs 411 and 413 in FIG. 4) may be desirably configured to transmit signals or messages at different times. For example, referring to operation 528, in one embodiment, each PEG 110 receiving an identification message from a broadcasting TAG (e.g. TAG 413) at a predefined transmit power level may be configured to wait for a predetermined period until the TAG 413 completes its round of broadcasting at that power level before sending or transmitting a reporting message to the control station 150 at operation 528. Determination of the predetermined period may be based on the received power level and the known duration of each round of increasing power level transmissions by the TAG 413. To further avoid radio traffic congestion when multiple reporting PEGs (e.g. PEGs 01, 02, 11, 12, 13, 21 and 22) are simultaneously transmitting reporting messages after the conclusion of each round, each of the reporting PEGs 01, 02, 11, 12, 13, 21 and 22 may preferably be configured to wait (e.g. pause transmissions) for different predetermined periods of time before reporting to the control station 150 at operation 528. Further, to avoid the radio interference between multiple broadcasting TAGs 411 and 413 within a wireless sensor network 160, each of the broadcasting TAGs 411 and 413 may be configured to have different round timing for localization message transmissions. Such variations in timing and/or delay of operations for PEGs 110 and TAGs 411 and 413 may be configured according to any suitable known method of coordinating multipoint wireless data communications as are known in the art.

Additionally, in some embodiments, transmission of messages by PEGs 110 and TAGs 411 and 413 may be configured to be made on multiple frequencies, such as to reduce radio traffic and/or interference. For example a first frequency may be utilized by each of the TAGs 411 and 413 for transmission of identification messages, while a second frequency may be utilized by PEGs 110 to transmit responding messages. In an exemplary embodiment, other more complicated multi-frequency transmission techniques for multi-point wireless data communications may be applied, such as spread-spectrum or frequency-hopping schemes, or any other suitable data communication coordination technique, such as may be known in the art.

With reference to the description above, embodiments of the method of localizing mobile nodes within a wireless sensor network 160 according to the present invention may desirably provide at least one of the following advantages over prior art methods:

1. Reduced power consumption as compared to traditional localization methods based on received signal strength indication methods (RSSI), which typically require high power radio frequency (RF) signal transmissions from a mobile node to ensure not only that all required sensor nodes may successfully receive the require message, but that the received signal strength is sufficiently high to be measured with a desired accuracy;
2. Improved localization accuracy as compared to traditional RSSI based methods, which may typically be prone to reflections, fading, scattering and other types of wireless signal interference as a result of the simultaneous broadcasting of typical high power RF signals;
3. Reduced power consumption in the case of localizations in close proximity to a reference node (i.e. PEG), as no triangulation is required if the identification message transmitted by a broadcasting TAG is received at the lowest, predetermined power level (e.g. TAG 411 localization based on proximity to the PEG 00);
4. Improved control of TAG location accuracy by selection of predetermined TAG transmission power levels without the need for hardware or firmware modifications;
5. Improved adaptation for indoor use as compared to traditional localization methods based on satellite navigation system localization, which typically is subject to significant limitations in indoor or other environments where a view of at least a portion of the sky is obstructed; and
6. Improved localization precision and adaptation for indoor use as compared to traditional RSSI methods, which typically employ relatively higher power levels for localization, resulting in higher reflections and signals fading.

Reduction of Power Consumption During Localization

In another aspect of the present invention, TAG (e.g. TAG 120) power consumption during TAG 120 localization may desirably be reduced by dynamically controlling the frequency of communication between a TAG 120 and reference PEGs 110 based on the level of activity or movement of the TAG 120. In one embodiment, a TAG 120 may be equipped with a movement detection sensor (not shown) (e.g. an accelerometer or other suitable sensor). Based on readings related to the rate of movement (i.e. velocity) of the TAG 120 and/or the rate of change of movement (i.e. acceleration) of the TAG 120, the frequency with which identification messages are broadcast to the PEGs 110 may be adjusted accordingly to conserve power while still providing a desired dynamic accuracy of the location of the TAG 120, such as for tracking purposes. In such embodiments, the frequency of localization of the TAG 120 may typically be increased as the velocity and/or acceleration of the TAG 120 increases, and decreased as the velocity and/or acceleration of the TAG 120 decreases. For example, referring to FIG. 5A, to reduce the power consumed by a TAG 120 from its periodic restarting of a new set of identification message broadcasts during TAG 120 localization (e.g. the loop from operation 526 to operation 512), the frequency at which a TAG 120 restarts a new set of identification message broadcasts may desirably be controlled dynamically based on the level of activity (such as activity of any parameter monitored by the TAG 120 or the wireless sensor network 160 in general) or movement (i.e. velocity or acceleration) of the TAG 120.

Localization Enhancement During Harsh Conditions

Certain embodiments of the method of localizing mobile nodes within a wireless sensor network 160 according to the present invention may also include the following localization enhancement features. To enhance localization in harsh environments such as when wireless radio propagation conditions are poor or transmission or reception are inaccurate or unavailable, a TAG 120 may include an accelerometer (not shown) (or similar suitable sensor) to detect acceleration and/or velocity of the TAG 120 and a compass (not shown) (or other suitable direction sensor) to detect the direction of movement to supplement or enhance radio-based localization. The method may further include the operation of detecting the velocity and/or acceleration of movement and the direction of movement of a TAG 120, and calculating the relative location of a moving TAG 120 from its last known location based on the detected TAG 120 movement intensity and direction of movement.

Self-calibration

Figure 6A:
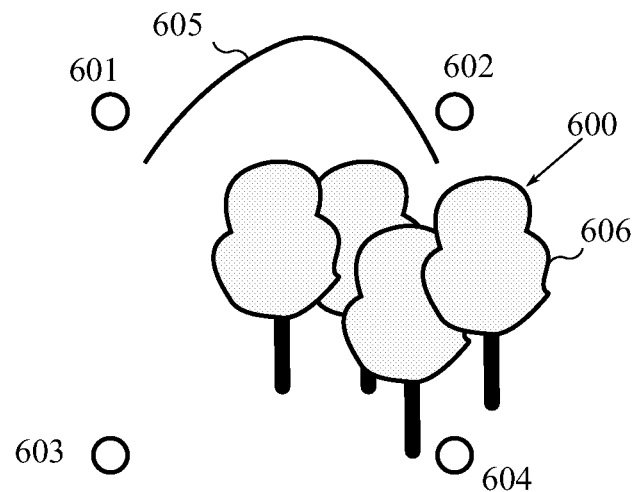
FIGS. 6A-6D are graphical representations of a method of self-calibrating a wireless sensor network 160 according to an exemplary embodiment of the invention.

In another aspect, a method of self-calibrating a wireless sensor network 160 is provided according to an embodiment of the present invention. In order to increase the accuracy and/or precision of localization, obstacles, unevenness, and other disturbances of natural and artificial origin which may affect the transmission and/or reception of wireless signals in an environment of interest, such as unevenness and geographical obstacles in a terrain, and interferences from metal objects and other magnetic influences, may desirably be mapped, recorded, or accounted for during the mobile node or TAG 120 localization process. FIG. 6A is a graphical schematic of an exemplary cluster 600 of four PEGs 601-604 of a wireless sensor network 160 which are deployed on an exemplary environment of interest (outdoor terrain) and the location of obstacles that may commonly be found on the environment and which may affect the transmission and/or reception of wireless signals. As shown in FIG. 6A, the exemplary obstacles include a hill 605 which exists between PEGs 601 and 602, and a forest 606 which exists near PEG 604.

Such obstacles may typically adversely affect the strength of the wireless radio signals and the quality of communication between any two PEGs in cluster 600 whose line of sight connection passes through or near the obstacles, and between any of the PEGs 601-604 and a TAG (e.g. TAG 120 as shown in FIG. 1) that moves within cluster 600 where a line of sight connection between the PEG and TAG 120 passes through or near the obstacles. Such interference in wireless signal transmission and reception due to such obstacles may therefore be expected to decrease the accuracy and/or precision of TAG 120 localization results within the cluster 600 of wireless sensor network 160.

To clarify the advantages and benefits of the present method of self-calibrating a wireless sensor network 160 disclosed herein, a comparison to a conventional method of calibrating wireless sensor networks as known in the art is provided. A conventional approach to account for the geographical or other non-uniformity in the radio space in which a wireless sensor system 100 is deployed may typically rely on manual system calibration using a mobile node (e.g. a TAG 120). In such a method, a calibration engineer must manually place the TAG 120 in multiple known locations (i.e. establish a calibration standard) and compare these actual, known TAG 120 locations with system-generated TAG 120 location estimates using standard localization estimate techniques, and then subsequently perform calibration of the wireless sensor system to adjust or correct the system-generated TAG 120 location estimates or readouts to the actual known positions of the TAG 120. Ideally, the TAG 120 should be placed and the system calibrated for all possible locations that the TAG 120 may be in the wireless sensor network 160 during normal system operation. However, such an exhaustive approach is typically neither desirable nor feasible as the process would be prohibitively time and resources consuming and can not be efficiently executed in the deployment of large wireless sensor systems 100 containing many sensor nodes (e.g. PEGs 110). Accordingly, in practice of such conventional manual calibration methods the TAG 120 is typically only placed at selected few known locations to calibrate the system, thereby compromising the effectiveness of the calibration process and the accuracy and/or precision of localization using the calibrated system.

Figure 6B:
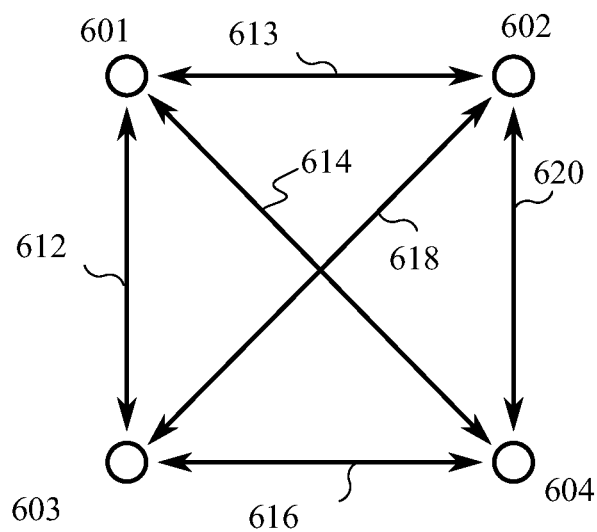

In order to account for the disturbances of natural and artificial origin to radio frequency transmission in an environment of interest on localization accuracy/precision, a method of self-calibrating a wireless sensor network 160 according to an embodiment of the invention is provided, which may further also advantageously provide for relatively faster and simpler wireless sensor system 100 deployment as compared to prior art manual calibration methods, as the potentially error-prone, complicated, and time-consuming process involving the manual placement of a mobile node (e.g. a TAG 120) at multiple locations in the wireless sensor network to establish calibration standards may desirably be avoided. Radio communication between a mobile TAG 120 and a PEG 110 is adversely affected by extraneous objects in a similar manner as the communication between two neighbouring PEGs 110. The strength of the wireless signals communicating between every two neighbouring PEGs 110 may be used to create a map of transmission coefficients or "weights" representative of the wireless signal transmission channel qualities between every two neighbouring PEG 110 locations. For example, as shown in FIG. 6B, within cluster 600, a set of six transmission channels 612, 613, 614, 616, 618 and 620 are defined between each pair of neighboring PEGs 601-604, and wireless signal transmission coefficients or weights are measured by transmitting signals along each single-hop communication paths between each neighbouring pair of PEGs 601-604 (defined as the path required to relay data from one neighboring PEG to another in a single direct transmission or hop). A representative map of each wireless transmission channel and their corresponding transmission coefficients or weights may then be created and subsequently used during the TAG 120 localization process to calibrate or account for the effect of radio frequency disturbances on transmission and reception of signals within the wireless sensor network 160, and their corresponding effect on localization accuracy/precision.

Figure 6C:
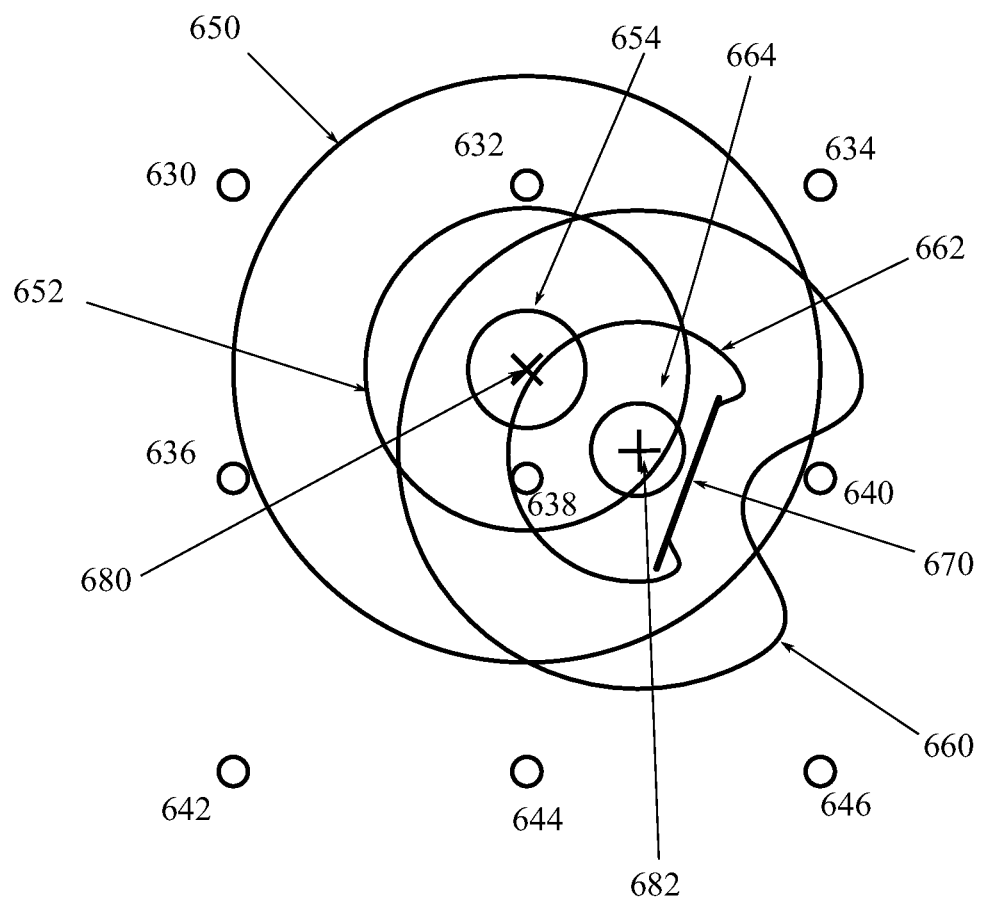
Figure 6D:
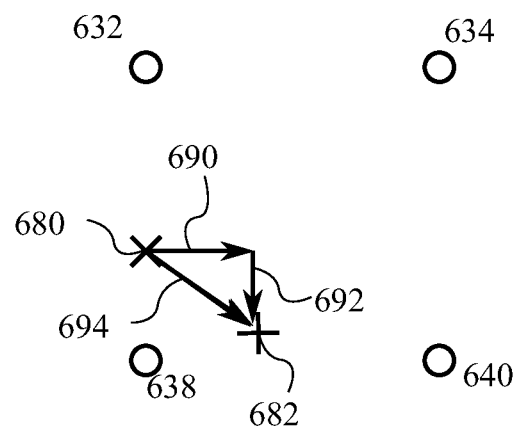
Figure 7:
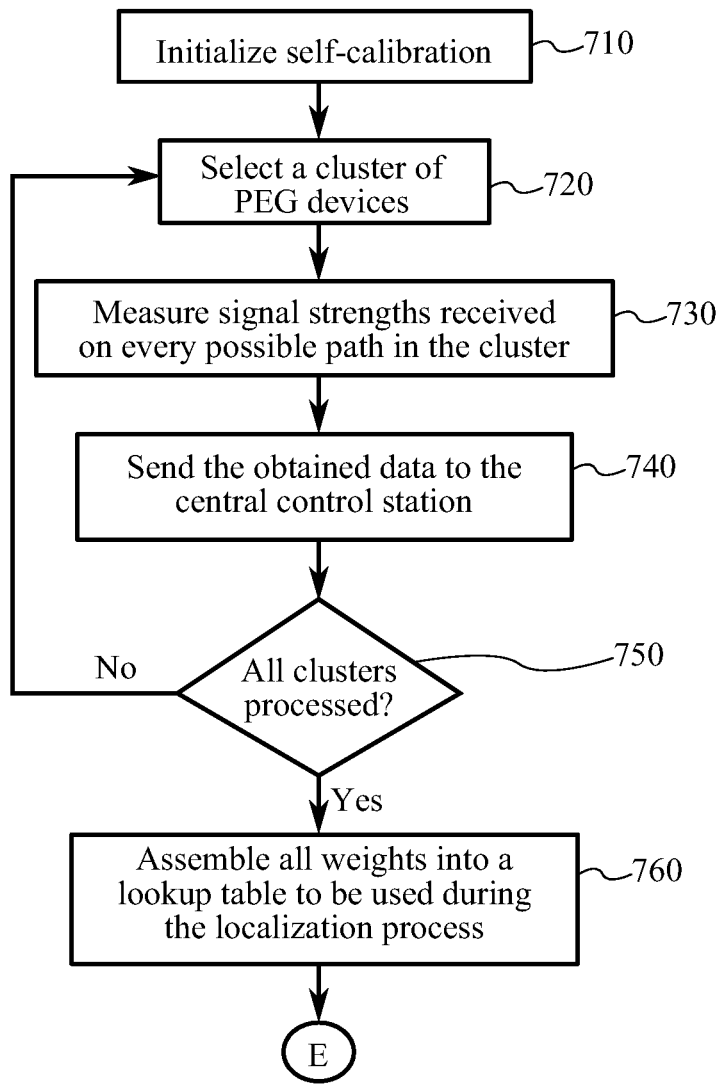
FIG. 7 is a flow diagram corresponding to a method of self-calibrating a wireless sensor network 160 according to an exemplary embodiment of the invention.

Referring now to FIGS. 6C and 6D and FIG. 7, graphical representations and a flow diagram of a method of self-calibrating a wireless sensor network 160 according to an exemplary embodiment of the invention are respectively shown. The method of self-calibrating a wireless sensor network 160 may be practiced either during wireless sensor system 100 deployment, or at any time following deployment of the system, such as to re-characterize obstacles within the wireless sensor network 160, for example. As shown in FIG. 7, the instant method begins at operation 710, at which the self-calibration process is initialized. The initialization operation may include configuring PEGs 110 to broadcast signals for purposes of the self-calibration process for example.

Next, at operation 720, a cluster of PEGs 110 is selected. To create a map of transmission channel coefficients or weights for every two neighbouring PEGs 110 in the entire wireless sensor network 160, the method may divide the network into PEG clusters, and iteratively create a sub-map for each PEG cluster until the entire network is mapped out. Alternatively, the cluster of PEGs 110 may comprise any portion of or the entire network of PEGs 110 in the wireless sensor network 160.

Following the selection of a cluster of PEGs 110, the method proceeds to operation 730 at which the strength of wireless signals transmitted between every two neighbouring PEGs 110 is measured. In one embodiment, the measurement of the wireless signal strengths may be accomplished by configuring each PEG 110 in the selected cluster to receive radio signals transmitted at a known power level from surrounding PEGs 110 in the same cluster, and recording the strength at which those signals are received and the identification of the PEG transmitting the signal for each pair of PEGs 110.

Next, at operation 740, the measured radio signal strengths for each transmission channel between a pair of PEGs 110 may be forwarded to a central control station (e.g. control station 150) for further data processing in order to calculate transmission coefficients or weights for each transmission channel or path in the cluster. In one embodiment, such data may be forwarded to the control station 150 via one or more gateways 130, and optionally also by an intermediate network 140, for example.

Next, as shown at operation 750, a determination is made, such as by the control station 150, as to whether transmission coefficients or weights for each transmission channel or path in each of the clusters in the wireless sensor network 160 have been determined. If not, the measurement of the strength of wireless signals transmitted between each pair of neighbouring PEGs 110 and the reporting of the same to the control station 150 are repeated for each new selected cluster (operations 720, 730 and 740) until all clusters have been measured and processed by the control station 150 to calculate weights for all neighboring PEG transmission channels.

Following the completion of the measurement of signal strengths and processing of weights for each transmission channel in each cluster, at operation 760, the weights or transmission coefficients corresponding to the measured strengths of the signals between neighbouring PEGs assembled into a lookup table for use during subsequent TAG 120 localization process, such as proceeding to operation 532 (FIG. 5B), as shown by the dotted arrow drawn from operation 760 ending with an encircled "E" and further described in detail below. In an alternative embodiment, the processing of measured signal strengths for all transmission channels in the wireless sensor network 160 may be completed at operation 760 rather than at operation 740 for each cluster as signal strength measurements are made and sent to the control station 150.

In one embodiment, the lookup table of channel weights determined from the method of self-calibrating a wireless sensor network 160 may be integrated into embodiments of the method of localizing mobile nodes in a wireless sensor network 160, such as the embodiment as shown in FIGS. 5A and 5B for example. Referring to FIG. 5B, following the determination of the relative location of a TAG 120 at operation 530 based on the DTPV localization technique, the method of localizing mobile nodes in a wireless sensor network 160 may proceed to operation 532, at which the table of channel weights determined from the method of self-calibrating a wireless sensor network 160 may be used to create a displacement or translation vector to correct the localization results derived from operation 528, accounting for the adverse influence of extraneous objects in the radio space on signal quality and localization accuracy/precision.

The calculation and use of a displacement vector to correct localization results (e.g. operation 532) may be further understood with reference to FIGS. 6C and 6D, which illustrate graphical representations of a method of self-calibrating a wireless sensor network 160 according to an exemplary embodiment of the invention. FIGS. 6C and 6D also illustrate the adverse effect of an obstacle 670 in a wireless sensor network 160 on TAG localization results due to distortion and/or attenuation of wireless signal transmission within the wireless sensor network 160. As shown in FIGS. 6C and 6D, the location of the TAG 120 as determined according to operation 530 without system calibration and therefore without accounting for the presence and effect of obstacle 670 is represented by reference numeral 680. The actual location of TAG 120 is, however, at the position represented by reference numeral 682. As shown in FIG. 6D with reference to FIG. 5B, to compensate for the effect of non-uniformity in the radio space due to the presence of obstacle 670, a translation vector 694 (derived according to operation 532 for example) may be used to modify the apparent TAG 120 location 680 (derived according to operation 530 for example) to a location closer to the actual location 682 of the TAG 120. The components 690 and 692 of translation vector 694 as illustrated in FIG. 6D may in turn be derived from the channel weights obtained during the execution of the method of self-calibrating a wireless sensor network 160 (e.g. according to operation 760).

In an alternative embodiment, the method of self-calibration of a wireless sensor network 160 as described above and illustrated in FIGS. 6A-6D and 7 may also be applied to localization methods known in the prior art, such as localization methods based on RSSI techniques for example. In such embodiments, the above-described methods of self-calibration may be used to determine a translation vector 694 which may then be applied to correct the localization position determined by a prior art localization method such as an RSSI-based technique, in order to provide a calibrated localization position which accounts for the effects of obstacles and/or other disturbances in the radio space of the wireless sensor network 160.

In an optional embodiment, a wireless sensor network 160 may periodically apply the above-described methods of self-calibration such as to account for changing effects of obstacles or other disturbances in the radio space of the network 160, such as seasonal, or temporary obstacles or other disturbances, for example. Such periodic re-calibrations of the wireless sensor network 160 may be used to update the translation vector 694 applied to a localization position to improve the instantaneous accuracy and/or precision of localization. Alternatively, in the case where obstacles or other disturbances in the radio space of the network may dynamically or randomly vary over time, multiple iterations of the above-described self-calibration methods may be applied by the wireless sensor system such as to characterize repeating or periodic variation effects, or to estimate an average effect of varying obstacles and/or disturbances such as to further improve the accuracy/precision of localization within the wireless sensor network 160. An example of such a randomly changing variation affecting wireless signal transmission may be multipath effects such as within a crowded urban and/or indoor environment where multiple iterations of the above-described self-calibration methods may desirably be applied to estimate an average effect of such variation and to thereby allow the determination of an appropriate average translation vector for correction of localization positions for any inter-PEG TAG 120 position.

With reference to the description above, embodiments of the method of self-calibrating a wireless sensor network 160 according to the present invention may desirably provide at least one of the following advantages over prior art methods:
  1. Improved localization accuracy/ precision compared to TAG 120 localization with no calibration; and
  2. Improved speed/cost and/or simplicity of system deployment than conventional manual calibration methods, as the repetitive time- and resource-consuming manual calibration operations involving taking repeated calibration measurements at many pre-known TAG 120 locations are eliminated.

Although the invention has been described with reference to the use of radio signals for the self-organization and self-calibration of a wireless sensor network, and the localization of mobile nodes within a wireless sensor network, it will be understood by a person of ordinary skill in the art that the methods of the invention are not limited to single-frequency radio communications, and may employ any electromagnetic spectrum or bandwidth for wireless communications as long as the transmit power level of a signal transmitted at that selected electromagnetic spectrum or bandwidth corresponds with its signal communication range.

Embodiments of the present invention as above described may desirably be implemented in whole or in part in a computer storage product with a computer-readable medium having computer code thereon for performing various computer-implemented operations according to and as described in the methods described above, such as for execution at least in part by a computer system. Such computer system may comprise any suitable general computing system which may include localized and distributed and/or networked computer systems, or may also comprise any suitable application or task-dedicated or specific computing system, as may be known in the art for implementing wireless sensor networks and/or control and operation thereof. The computer-readable media and computer code may be those specially designed and constructed for the purposes of the present invention, or they may be of the kind well known and available to those having skill in the computer software arts. Examples of computer-readable media include, but are not limited to: magnetic media such as hard disks, floppy disks, solid state memory storage devices and magnetic tape; optical media such as Blu-Ray™ DVD, or CD-ROM discs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using XML, JavaScript, C#, C++, or other scripting, markup and/or programming languages and development tools. Another embodiment of the invention may be implemented in hardwired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of self-organizing sensor nodes in a wireless sensor network (WSN), the WSN comprising a plurality of sensor nodes in communication with a master node, the method comprising:
    distributing/installing each one of the plurality of sensor nodes randomly at one of a plurality of predefined absolute geographical locations, without relating a node identification with an installed predefined geographical location, wherein at least two of the sensor nodes are anchor nodes of known identification and absolute geographical locations;
    configuring each of the sensor nodes to in turn transmit consecutive messages at a plurality of pre-defined and incrementally increasing transmitted power levels to identify a lowest pre-defined power level that enables message reception at each of a plurality of other sensor nodes;
    detecting receipt of the transmitted messages at each of the sensor nodes and notifying the master node as to the identity of each sensor node receiving the transmitted message and the transmitted power level of the message to define a neighbourhood for each sensor node;
    determining relative locations of each sensor node in relation to other sensor nodes within the WSN based on the neighbourhood for each sensor node, wherein said neighbourhood for each sensor node is defined by reception of messages transmitted by said sensor node at increasing pre-defined transmitted power levels by a plurality of surrounding sensor nodes; and
    relating the identification of each sensor node with a geographical location from a list of said predefined absolute geographical locations based on the relative locations of the sensor nodes based on results of the neighborhoods, the known locations of the two anchor nodes, and the plurality of predefined absolute locations.

2. A method of localizing mobile sensor nodes in a wireless sensor network (WSN), the WSN comprising a plurality of mobile sensor nodes and fixed sensor nodes, wherein the plurality of mobile sensor nodes and fixed sensor nodes are connected to a master node, the method comprising:
    transmitting a first identification message of a series of identification messages from a mobile sensor node at a lowest transmit power level from a predefined set of transmit power levels;
    detecting receipt of the first identification message at each of the fixed sensor nodes and sending a response message to the mobile sensor node if the first identification message is received by each of the fixed sensor nodes, wherein said response message identifies each fixed sensor node receiving the first identification message without identification of a measured received signal strength of the first identification message;
    estimating, based on a reception range of the first transmitted message, the location of the mobile sensor node relative to the responding fixed sensor node(s) if the first identification message is received, else transmitting a second identification message from the mobile sensor node at a plurality of increasing second predefined transmit power levels, the second predefined transmit power levels being incrementally higher than the lowest transmit power level;
    detecting receipt of the second identification message at each of the fixed sensor nodes and sending a response message to the mobile sensor node as to the identity of each fixed sensor node receiving the second identification message and the second transmit power level of the second identification message which was received; and
    determining the location of the mobile sensor node relative to the fixed sensor nodes based on the lowest transmit power levels at which the first and second identification messages are received by the fixed sensor nodes.

3. The method of localizing a mobile node in a WSN according to claim 2, additionally comprising using an accelerometer and a compass integrated with the mobile sensor node to supplement/enhance radio-based localization.

4. The method of localizing a mobile node in a WSN according to claim 2, additionally comprising:
    controlling the frequency of transmitting the first and second identification messages by the mobile sensor node based on the motion of the mobile sensor node.

5. A method of self-calibrating a wireless sensor network (WSN), the WSN comprising a plurality of sensor nodes connected to a master node, the method comprising:
    transmitting wireless signals at a plurality of pre-defined incrementally increasing transmitted power levels between each pair of neighboring sensor nodes among the plurality of sensor nodes;
    measuring received signal strength at each of the neighboring sensor nodes for each of the pre-defined incrementally increasing transmitted power levels at which the signal was transmitted;
    determining a transmission coefficient based on the received signal strength for messages transmitted at multiple pre-defined incrementally increasing transmitted power levels for each pair of neighboring sensor nodes; and
    determining a translation vector for each position between pairs of neighboring sensor nodes based on the corresponding transmission coefficients for the neighboring sensor nodes, wherein each said translation vector is operable to calibrate a localized position for a mobile node located at a position between a pair of sensor nodes.

6. The method of self-calibrating a WSN according to claim 5, additionally comprising:
- receiving a localized position for a mobile node located between a pair of neighboring sensor nodes; and
- applying a corresponding translation vector to the localized position to determine a calibrated localization position for the mobile node.

7. The method of self-calibrating a WSN according to claim 5, additionally comprising repeating the transmitting, measuring and determining operations to account for at least one variation of wireless signal transmission in the WSN.

* * * * *